(12) United States Patent
Ohgi et al.

(10) Patent No.: US 7,526,783 B2
(45) Date of Patent: Apr. 28, 2009

(54) DISK CARTRIDGE

(75) Inventors: Takashi Ohgi, Miyagi (JP); Takahiro Yamada, Saitama (JP); Kazuhito Kurita, Kanagawa (JP); Tokio Kanada, Kanagawa (JP); Toru Morikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 10/541,456

(22) PCT Filed: Oct. 27, 2004

(86) PCT No.: PCT/JP2004/015944

§ 371 (c)(1),
(2), (4) Date: Jul. 6, 2005

(87) PCT Pub. No.: WO2005/052939

PCT Pub. Date: Jun. 9, 2005

(65) Prior Publication Data

US 2006/0075410 A1 Apr. 6, 2006

(30) Foreign Application Priority Data

Nov. 27, 2003 (JP) .............................. 2003-398150
Nov. 27, 2003 (JP) .............................. 2003-398151
Nov. 27, 2003 (JP) .............................. 2003-398153

(51) Int. Cl.
*G11B 33/02* (2006.01)
(52) U.S. Cl. .................................... 720/743
(58) Field of Classification Search ................. 720/743
See application file for complete search history.

(56) References Cited

U.S. PATENT DOCUMENTS

| 4,908,817 | A | | 3/1990 | Sandell et al. |
| 5,257,153 | A | | 10/1993 | Sakurada |
| 6,125,012 | A | * | 9/2000 | Miyazaki et al. ............ 360/133 |
| 6,166,883 | A | * | 12/2000 | Miyata et al. ............... 360/133 |

(Continued)

FOREIGN PATENT DOCUMENTS

EP 0 498 607 8/1992

(Continued)

OTHER PUBLICATIONS

U.S. Appl. No. 10/541,456, filed Jul. 6, 2005, Ohgi et al.

(Continued)

*Primary Examiner*—Mark Blouin
(74) *Attorney, Agent, or Firm*—Oblon, Spivak, McClelland, Maier & Neustadt, P.C.

(57) ABSTRACT

A disk cartridge is provided which includes an optical disk (2), a cartridge body (5) having formed therein a head opening (13) through which a part of the optical disk (2) is exposed to outside in a range between the inner and outer radii thereof, a shutter member (15) supported movably on the cartridge body (5) to uncover and cover the head opening (13), and a two-way forcing mechanism (38) to force the shutter member (15) toward any selected one of positions to cover and uncover the head opening (13). The two-way forcing mechanism (38) forces the shutter member (15) toward any selected one of the positions to cover and uncover the head opening (13) correspondingly to a position of the shutter member (15) relative to the head opening (13).

17 Claims, 34 Drawing Sheets

U.S. PATENT DOCUMENTS

| | | | |
|---|---|---|---|
| 6,789,261 B2 * | 9/2004 | Oishi | 720/719 |
| 2001/0036039 A1 * | 11/2001 | Yamamoto et al. | 360/133 |
| 2002/0036248 A1 | 3/2002 | Morita et al. | |
| 2003/0185146 A1 | 10/2003 | Roberts | |

FOREIGN PATENT DOCUMENTS

| | | |
|---|---|---|
| EP | 0 944 083 | 9/1999 |
| JP | 204573/1982 | 12/1982 |
| JP | 61-206984 | 9/1986 |
| JP | 9-91915 | 4/1997 |

OTHER PUBLICATIONS

U.S. Appl. No. 10/556,809, filed Nov. 15, 2005, Ohgi.
U.S. Appl. No. 10/541,456, filed Jul. 6, 2005, Ohgi et al.
U.S. Appl. No. 10/545,403, filed Aug. 12, 2005, Kurita et al.

* cited by examiner (a)

(b)

DISK CARTRIDGE

TECHNICAL FIELD

The present invention relates to a disk cartridge housing a disk such as an optical disk or the like.

This application claims the priority of the Japanese Patent Application Nos. 2003-398150, 2003-398151 and 2003-398153 filed on Nov. 27, 2003, the entirety of which is incorporated by reference herein.

BACKGROUND ART

Conventionally, there are used many disk cartridges each of which houses a disk such as an optical disk or the like rotatably therein and is inserted into a disk drive unit which writes and/or reads information signals to and/or from the disk loaded into place while being still held in the disk cartridge. The disk cartridge of this type houses in a cartridge body thereof a disk to be protected, and permits easy insertion and ejection of the disk into and out of the disk drive unit.

To load a disk housed in the cartridge body of the disk cartridge into the disk drive unit, the cartridge body has formed therein a write and/or read opening (will be referred to as "write/read opening" or "head opening" hereunder) through which a part of the disk can be exposed to outside in a range between the inner and outer radii thereof. A write/read head provided at the disk drive unit, such as an optical pickup, is opposite to the disk through the write/read opening and scans the signal recording area on the disk to write or read information signals to or from the disk.

Note here that if the write/read opening formed in the cartridge body is left uncovered, dust or the like will possibly enter the cartridge body and contaminate the disk housed in the cartridge body when the disk cartridge is not used in any disk drive unit, such as during storage or the like.

On this account, the disk cartridge housing a disk is provided with a shutter member to cover the write/read opening (head opening). There has been proposed a disk cartridge provided with such a shutter member as well as with a spring member which forces the shutter member to cover the write/read opening in order to prevent the write/read opening from being uncovered while the disk cartridge is not in use.

A disk cartridge having provided therein a forcing member such as a spring member to force the shutter member in a direction to cover the write/read opening is known from the disclosure in the Japanese Patent Application Laid Open No. 91915 of 1997.

In the conventional disk cartridges provided with a shutter member, including the one disclosed in the above Japanese Patent Application Laid Open No. 91915 of 1997, the shutter member is forced by a forcing member only in the direction to cover the write/read opening.

To positively uncover the write/read opening covered with the shutter member having been forced only in the covering direction, the shutter member has to be further moved from the position to uncover the write/read opening, namely, an over-stroke of the shutter member is required. As the result, the shutter member has to be moved in a larger range, which will make it difficult to design the disk cartridge more compact. When a disk cartridge designed for such an over-stroke of the shutter member is loaded in the disk drive unit and shutter member is held in the position to uncover the write/read opening against the force of the forcing member, a backlash will arise. Such a shutter member will be swayed even with a small vibration and cannot be held stably in the position to uncover the write/read opening. Such a sway of the shutter member will have an influence on the write/read performance of the disk drive unit and hence no quality write/read performance can be assured.

Also, in a disk drive unit compatible with a disk cartridge provided with a forcing member to force the shutter member only in a direction to cover the write/read opening, a holding mechanism to hold the shutter member in a position to uncover the write/read opening against the force of the forcing member will lead to a complicated construction of the disk drive unit. Further, the holding mechanism should have a sufficient power to hold the shutter member in the position to uncover the write/read opening against the force of the forcing member for the shutter member. Therefore, the mechanism itself is unavoidably larger, resulting in a difficulty to design the disk drive unit itself more compact and lightweight.

In addition to the aforementioned disk cartridge, there has also been proposed a disk cartridge having installed pivotably inside a cartridge body thereof a return helical spring fixed at one end thereof to a shutter member to force the latter in any selected one of directions to uncover and cover the write/read opening. In the disk cartridge of this type, when the return helical spring reverses its course as the shutter member is moved to uncover or cover the write/read opening, it will start forcing in the opposite direction. Thus, when the shutter member is moved in a direction to uncover the write/read opening, the return helical spring will force the shutter member toward a position to uncover the write/read opening and hold it in that position. On the other hand, when the shutter member is moved in a direction to cover the write/read opening, the return helical spring will force the shutter member toward a position to cover the write/read opening and hold it in that position.

Since it is difficult to provide such a return helical spring in the cartridge body after upper and lower halves of the cartridge body are butt-joined to each other, the return helical spring has to be provided pivotably inside the cartridge body in advance and then connected to the shutter member.

However, it is difficult to simultaneously assemble the shutter member to the cartridge body and fix the return helical spring to the shutter member and it is necessary to prevent the return helical spring from being disengaged from the shutter member when the latter is moved to uncover or cover the write/read opening.

Also, the free end of the return helical spring provided inside the cartridge body will possibly be freely pivotable inside the cartridge body, touch and scratch the disk until the shutter member is installed to the cartridge body.

DISCLOSURE OF THE INVENTION

Problems to be Solved by the Invention

It is therefore an object of the present invention to overcome the above-mentioned drawbacks of the related art by providing a disk cartridge in which a write and/or read opening formed in a cartridge body housing a disk can positively be uncovered and covered.

It is another object of the present invention to provide a disk cartridge in which a shutter member to uncover and cover a write and/or read opening formed in a cartridge body housing a disk can positively be held in positions to uncover and cover the write and/or read opening.

It is another object of the present invention to provide a disk cartridge which can be loaded stably in a disk drive unit.

It is another object of the present invention to provide a disk cartridge which can be designed more compact by reducing the moving range of a shutter member which uncovers and covers a write and/or read opening.

It is another object of the present invention to provide a disk cartridge which can contribute to a simplified construction and more compact design of a disk drive unit the disk cartridge is compatible with.

It is another object of the present invention to provide a disk cartridge in which there can easily be installed a return helical spring to force a shutter member which uncover and cover a write and/or read opening formed in a cartridge body housing a disk in any selected one of directions to uncover and cover the write and/or read opening and the shutter member and return coil spring are positively engaged on each other.

It is another object of the present invention to provide a disk cartridge in which there can easily be installed a return helical spring to force a shutter member which uncover and cover a write and/or read opening formed in a cartridge body housing a disk in any selected one of directions to uncover and the return helical spring is limited from being pivoted to protect the disk.

The above object can be attained by providing a disk cartridge including according to the present invention:

a disk;

a cartridge body housing the disk to be rotatable and having formed therein a write and/read opening through which a part of the disk is exposed to outside in a range between the inner and outer radii thereof;

a shutter member supported movably on the cartridge body to uncover and cover the write and/read opening; and a two-way forcing mechanism to force the shutter member toward any selected one of positions to cover and uncover the write and/or read opening.

In the above disk cartridge according to the present invention, the two-way forcing mechanism forces the shutter member in any selected one of directions to cover and uncover the write and/or read opening correspondingly to a position of the shutter member relative to the write and/or read opening.

Note here that the two-way forcing mechanism is provided upstream of the moving direction of the shutter member to uncover the write and/read opening.

More specifically, the two-way forcing mechanism is formed from a return helical spring connected between the shutter member and cartridge body.

The above return helical spring included in the two-way forcing mechanism includes a first coil portion formed at the middle thereof and from which a pair of arm portions extends and a second coil portion provided at the free end of one of the arm portions and wound in a direction opposite to the winding direction of the first coil portion, the second coil is supported at a part of the cartridge body while the second arm portion is supported on a shutter portion of the shutter member, thereby forcing the shutter member in either direction to cover or uncover the write and/read opening.

Also, the return helical spring includes an engagement portion bent at the free end of the other arm portion to have a generally horseshoe-like shape and whose portion extending from the second arm portion and/or portion bent parallel to the extension portion form a predetermined angle with the extending direction of the other arm portion, and the engagement portion is engaged on the shutter member.

Also, the two-way forcing mechanism includes a pivoting member supported pivotably on the cartridge body and which is pushed to turn by the pushing portion of the shutter member when the shutter member is moved in a direction to uncover or cover the write and/read opening, and a forcing member to force the pivoting member to turn toward the pushing portion, and the pivoting member may be a member having a first slope which guides the shutter member in a direction to cover the write and/or read opening and a second slope which guides the shutter member in a direction to uncover the write and/read opening. The shutter member is guided onto either the first or second slope correspondingly to a position of the shutter member relative to the write and/or read opening.

In the two-way forcing mechanism, the pivoting member and forcing member may be formed integrally with each other from a leaf spring.

Further, the two-way forcing mechanism may be formed from a leaf spring including a first engagement projection which is engaged on the pushing portion of the shutter member, when the shutter member is moved to a position to cover the write and/or read opening, to hold the shutter member in the position to cover the write and/or read opening, and a second engagement projection which is engaged in the pushing portion of the shutter member, when the shutter member is moved to a position to uncover the write and/or read opening, to hold the shutter member in the position to uncover the write and/or read opening.

The cartridge body of the disk cartridge according to the present invention has the insertion front end thereof formed to have a generally semi-circular shape whose center is concentric with that of the disk housed in the cartridge body, and has the write and/or read opening formed at a lateral side other than the circular one thereof. In the disk cartridge constructed as above, the lateral side on which the shutter member moves is parallel to the moving direction of the shutter member.

Also the above object can be attained by providing a disk cartridge including according to the present invention:

a disk;

a cartridge body housing the disk to be rotatable and having formed therein a write and/read opening through which a part of the disk is exposed to outside in a range between the inner and outer radii thereof;

a shutter member supported movably on the cartridge body, having formed in one moving-directional end portion thereof a partially discontinuous engagement hole and which uncovers and covers the write and/read opening; and a return helical spring including a first coil portion formed at the middle thereof and from which a pair of arm portions extends, a second coil portion provided at the free end of one of the arm portions and which is supported pivotably on a part of the cartridge body, and an engagement portion bent at the free end of the other arm portion to have a generally horseshoe-like shape and whose portion extending from the second arm portion and/or portion bent parallel to the extension portion form a predetermined angle with the extending direction of the other arm portion, the engagement portion being engaged in the engagement hole formed in the shutter member, whereby the shutter member is forced in any selected one of directions to cover the write and/or read opening and uncover the write and/or opening.

In the disk cartridge according to the present invention, the first and second coil portions are wound a plurality of turns in directions opposite to each other.

Also the above object can be attained by providing a disk cartridge including according to the present invention:

a disk;

a cartridge body housing the disk to be rotatable and having formed therein a write and/read opening through which a part of the disk is exposed to outside in a range between the inner and outer radii thereof;

a shutter member supported movably on the cartridge body to uncover and cover the write and/read opening;

a two-way forcing mechanism engaged at one end thereof on a rising engagement portion formed on the cartridge body and at the other end on the shutter member to force the shutter member in any selected one of directions to cover and uncover the write and/or read opening; and a movement limiting portion formed on the moving trajectory of the two-way forcing member to limit the movement of the latter thereby preventing the two-way forcing mechanism from touching the disk.

The movement limiting portion used in the disk cartridge according to the present invention is formed from a limitation projection formed upright on the cartridge body or a peripheral wall formed upright on the cartridge body to define a compartment for the disk.

In the disk cartridge according to the present invention, since the shutter member is forced by the two-way forcing mechanism, it is moved in the position to cover the write and/or read opening or in the position to uncover the latter. So, the shutter member can be held in the position to cover or uncover the write and/or read opening without having to provide any mechanism intended to hold the shutter member at the disk drive unit. It is possible to cover or uncover the write and/or read opening.

Since the two-way forcing mechanism forces the shutter member in any selected one of the directions to cover and uncover the write and/or read opening correspondingly to a position of the shutter member relative to the write and/or read opening, the shutter member is moved in the direction to cover or uncover the write and/or read opening as the disk cartridge is inserted into or ejected output the disk drive unit, and thus positively covers or uncovers the write and/or read opening.

Also, since the shutter member is forced by the two-way forcing mechanism in the direction to cover or uncover the write and/or read opening, so it is not necessary to provide any over-stroke area for moving the shutter member to the position to uncover the write and/or read opening. The area for moving the shutter member may be smaller. As a result, the disk cartridge itself can be designed more compact.

Also, since the disk cartridge according to the present invention has the two-way forcing mechanism disposed upstream of the moving direction in which the shutter member will uncover the write and/or read opening, the two-way forcing mechanism can be disposed effectively in the internal space of the cartridge body, which will contribute to the more compact design of the disk cartridge.

Further, since the disk drive unit compatible with the disk cartridge according to the present invention needs not any mechanism to hold the shutter member in the position to uncover the write and/or read opening, the disk drive unit can be constructed more simply and can be designed more compact.

Furthermore, since the cartridge body of the disk cartridge according to the present invention has the insertion front end thereof formed to have a generally semi-circular shape whose center is concentric with that of a disk housed in the cartridge body, so the disk cartridge can be designed smaller according to the size of a disk to be housed therein. Also, since the write and/or read opening is formed opposite to a lateral side other than the circular one of the cartridge body, the shutter member can stably be installed movably in the cartridge body and positively cover the write and/or read opening.

Moreover, by forming the two-way forcing mechanism from a return helical spring including a first coil portion formed at the middle thereof and from which a pair of arm portions extends and a second coil portion provided at the free end of one of the arm portions and wound in a direction opposite to the winding direction of the first coil portion, the return helical spring as a whole can be formed to have a reduced thickness and hence the disk cartridge can be designed thinner.

In the disk cartridge according to the present invention, since the free end of the engagement portion formed on the other arm portion of the return helical spring is bent so that the bent portion extends under the shutter member, so even if the return helical spring or shutter member is swayed while the shutter member is uncovering or covering the write and/or read opening, the bent portion of the engagement portion abuts the bottom of the helical-spring retainer, so that the return helical spring and shutter member are prevented from being disengaged from each other.

Also, by forming the engagement portion of the return helical spring so that it is bent at two points, that is, at the extension portion and bent portion, to form predetermined angles, respectively, the extension portion extends over the shutter member while the bent portion extends under the shutter member. Therefore, even if the return helical spring or shutter member is swayed vertically while the shutter member is uncovering or covering the write and/or read opening, the extension portion of the engagement portion abuts the upper side of the shutter member and the bend portion abuts the lower side of the helical-spring retainer. Thus, the return helical spring and shutter member can effectively be prevented from being disengaged from each other.

In the disk cartridge according to the present invention, since the two-way forcing mechanism abuts the movement limiting portion formed upright on the moving trajectory of the two-way forcing mechanism and limited from moving, the two-way forcing mechanism can be prevented from touching and scratching the disk cartridge housed in the cartridge body.

BEST MODE FOR CARRYING OUT THE INVENTION

The present invention will be illustrated and explained in detail below concerning the embodiments of the disk cartridge according to the present invention with reference to the accompanying drawings.

Figure 1:
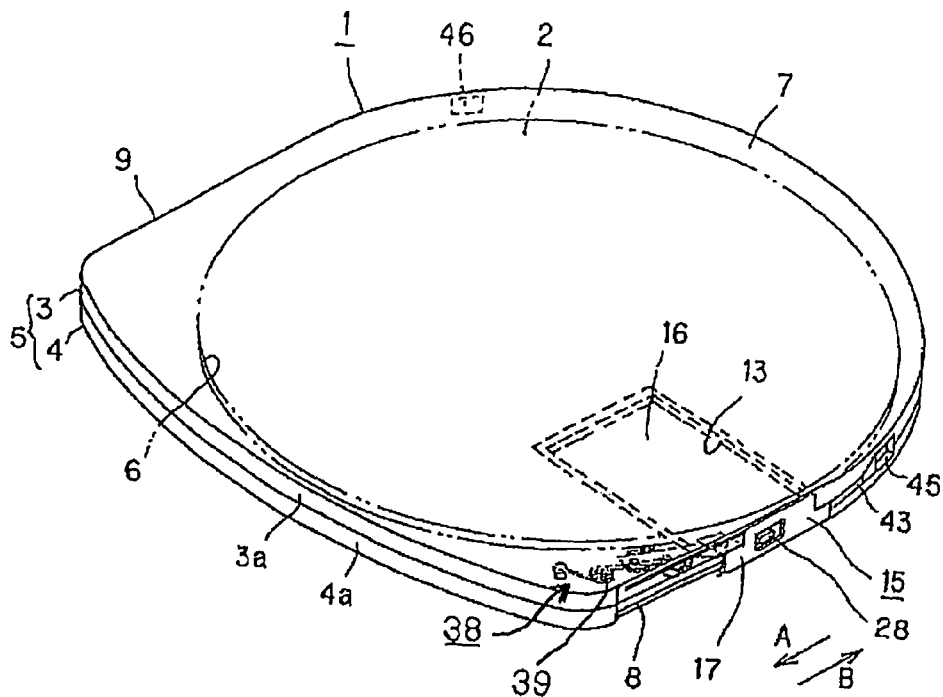
FIG. 1 is a perspective view, from an upper half, of the disk cartridge according to the present invention.
Figure 2:
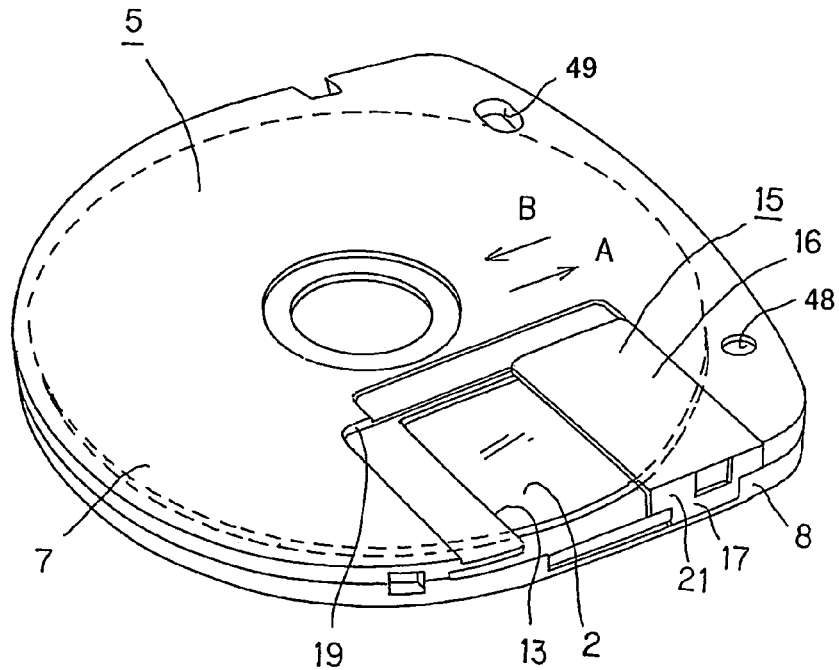
FIG. 2 is also a perspective view, from a lower half, of the disk cartridge according to the present invention.

The disk cartridge according to the present invention is generally indicated with a reference numeral 1 houses a disk such as an optical disk 2. As shown in FIGS. 1 and 2, the disk cartridge 1 includes a cartridge body 5 formed from a pair of halves, upper and lower, 3 and 4 butt-joined to each other. The optical disk 2 is housed rotatably in the cartridge body 5.

The disc cartridge 1 according to the present invention houses an optical disk 2 having recorded therein program data and video data intended for playing a video game, for example. It is designed to have an extremely compact size for holding in one hand. The disk cartridge 1 houses a small-diameter optical disk 2 whose diameter is about 60 mm, for example.

Note here that the disk cartridge 1 illustrated herein a one housing a read-only optical disk 2 having information signals such as program data or the like pre-recorded therein.

The upper and lower halves 3 and 4 forming together the cartridge body 5 that houses an optical disk 2 are formed from a synthetic resin to have rising peripheral walls 3a and 4a, respectively. The upper and lower halves 3 and 4 are joined to each other by making butt-junction of the rising peripheral walls 3a and 4a to each other thereby defining an internal disk compartment 6 to form the cartridge body 5. It should be noted that the upper and lower halves 3 and 4 are joined to each other by joining welding projections formed on the opposite inner surfaces of the upper and lower halves 3 and 4 to each other by the ultrasonic welding or the like to thereby form the cartridge body 5.

Also, the rising peripheral wall 4a of the lower half 4 is disposed to extend on the moving trajectory of a return helical spring 39 that forces a shutter member 15 in directions to uncover and cover an opening 13 (through which the write/read head of a disk drive unit will be exposed for write and/or read from and/or to the optical disk 2 and which will be referred to as "head opening" hereunder) as will be described in detail later to prevent the return helical spring 39 from touching and scratching an optical disk 2 housed in the cartridge body 5.

Figure 3:
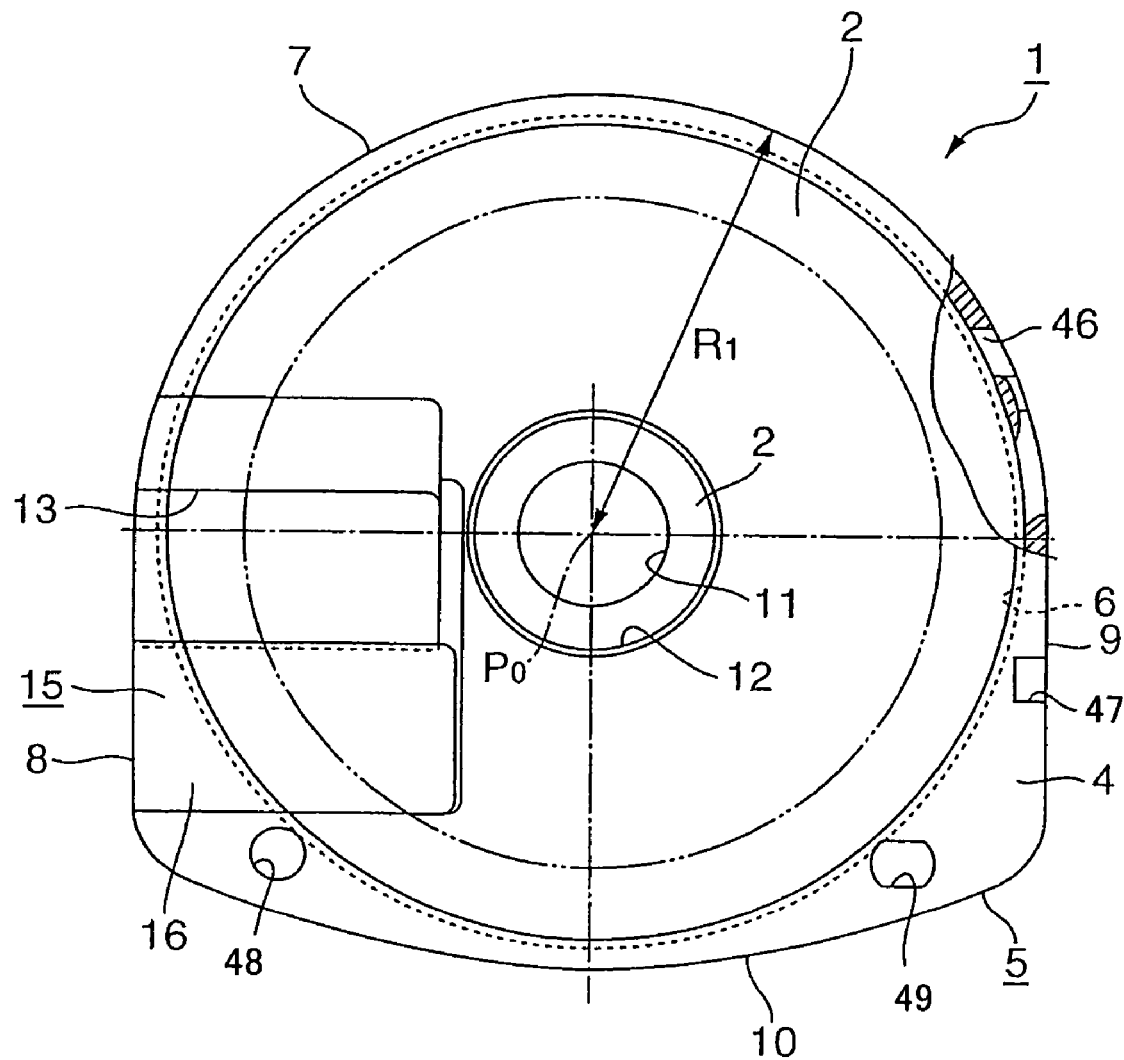
FIG. 3 is a plan view, from the lower half, of the disk cartridge according to the present invention.

As shown in FIGS. 1 to 3, the cartridge body 5 forming the disk cartridge 1 has one of front and rear end portions (indicated with a reference numeral 7) thereof formed circular. The disk cartridge 1 is to be inserted first at the circular front end portion 7 into a disk drive unit. As shown in FIG. 3, the circular front end portion 7 is designed to have a generally semi-circular shape whose radius is $R_1$ from a center $P_0$ coincident with the center of an optical disk 2 housed in the disk compartment 6 of the cartridge body 5. That is, the circular front end portion 7 has such a semi-circular shape as corresponds to the semicircle of an optical disk 2 housed in the cartridge body 5.

The cartridge body 5 has lateral sides 8 and 9 contiguous to the circular front end portion 7 and parallel to each other, and a rear end portion 10 opposite to the circular front end portion 7. The rear end portion 10 is curved gently and continuously.

Since the generally semi-circular front end portion 7 of the cartridge body 5 is more largely curved than the other sides including the lateral sides 8 and 9 and rear end portion 10, the user can easily know the direction in which the disk cartridge 1 should be directed for insertion into a slot-in type disk drive unit having a cartridge slot through which the disk cartridge 5 is to be inserted or ejected. Especially, since the disk cartridge 1 is designed so compact as can be held in one hand, the user can readily know, even by feeling when he or she holds the disk cartridge 1 in his or her hand, in which direction the disk cartridge 1 should be directed. Therefore, the disk cartridge 1 can correctly be inserted into the disk drive unit without insertion thereof in any wrong direction. In addition, the disk cartridge 1 can be inserted into the slot-in type disk drive unit easily and positively as will be described in detail later.

Further, because of the generally semi-circular front end portion 7 as the insertion end and the curved rear end portion 10 opposite to the circular front end portion 7, the disk cartridge 1 according to the present invention is nearly as compact as the optical disk 2 to be housed therein.

As shown in FIGS. 2 and 3, the lower halve 4 of the cartridge body 5 has formed in the center thereof a circular central opening 12 through which a center hole 11 formed in the center of the optical disk 2 housed in the cartridge body 5 and its periphery are exposed to outside. There is entered into the central opening 12 a part, for example, a turn table, of a disk rotation driving mechanism provided in a disk drive unit in which the disk cartridge 1 is inserted.

As shown in FIGS. 2 and 3, the lower half 4 of the cartridge body 5 has also formed therein the head opening 13. The head opening 13 is formed along one (8) of the lateral sides 8 and 9 of the cartridge body 5 to have the form of a rectangle whose size is sufficient to expose a part of the signal recording area of the optical disk 2 housed in the cartridge body 5 to outside in a range between the inner and outer radii of the optical disk 2. That is, the head opening 13 is formed in the lower half 4 along the lateral side 8 which is a straight, flat side next to the circular front end portion 7 of the cartridge body 5.

The disk cartridge 1 according to the present invention has a shutter member 15 installed movably therein to cover and uncover the head opening 13. The shutter member 15 is formed by punching a thin metal sheet and bending the punched sheet or by molding from a synthetic resin. Also, the shutter member 15 includes a flat shutter portion 16 formed to have a rectangular shape whose size is sufficient to cover the head opening 13 and a supporting portion 17 formed at the base end of the shutter portion 16 to have a generally horseshoe-shaped section.

Note here that the supporting portion 17 is supported on the upper half 3 of the cartridge body 5 such that the shutter member 15 is supported movably in the direction of arrow A or B shown in FIG. 2 and in which it will uncover or cover the head opening 13. More specifically, since the supporting portion 17 is supported on a sliding guide portion 18 formed from a part of the rising peripheral wall 3a of the upper half 3, so the shutter member 15 is supported movably on the cartridge body 5, as shown in FIG. 4.

Figure 4:
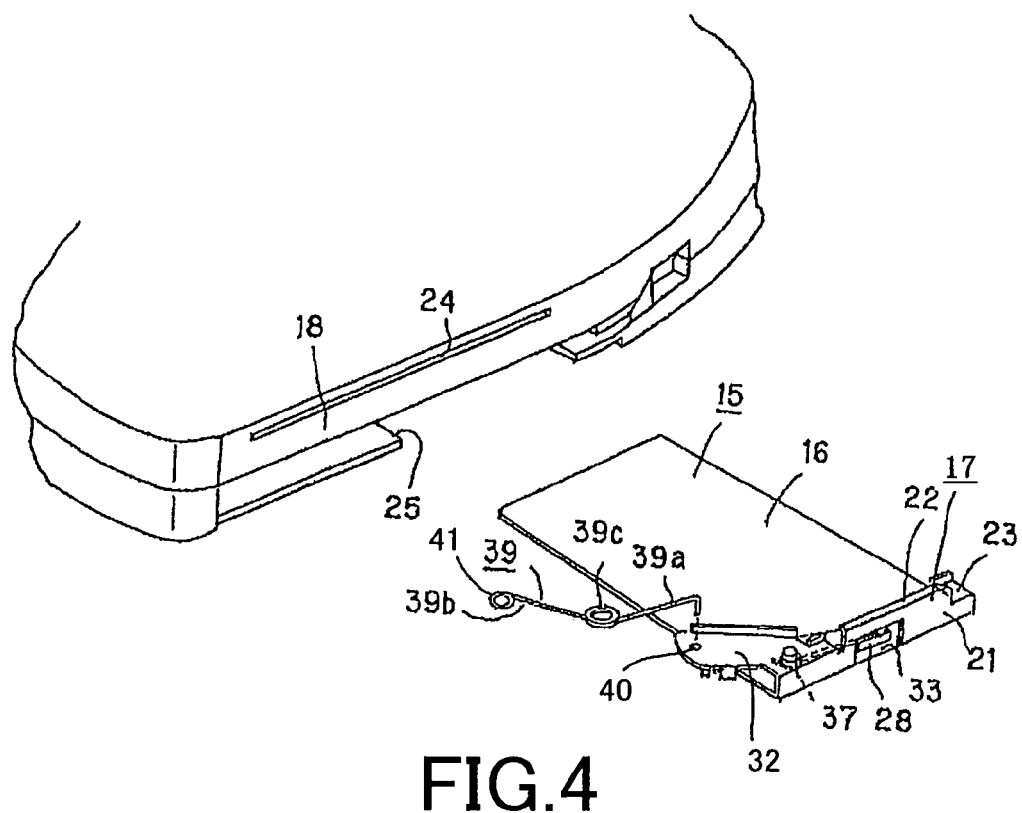
FIG. 4 is a perspective view of a shutter member and a cartridge body supporting the shutter member.
Figure 5:
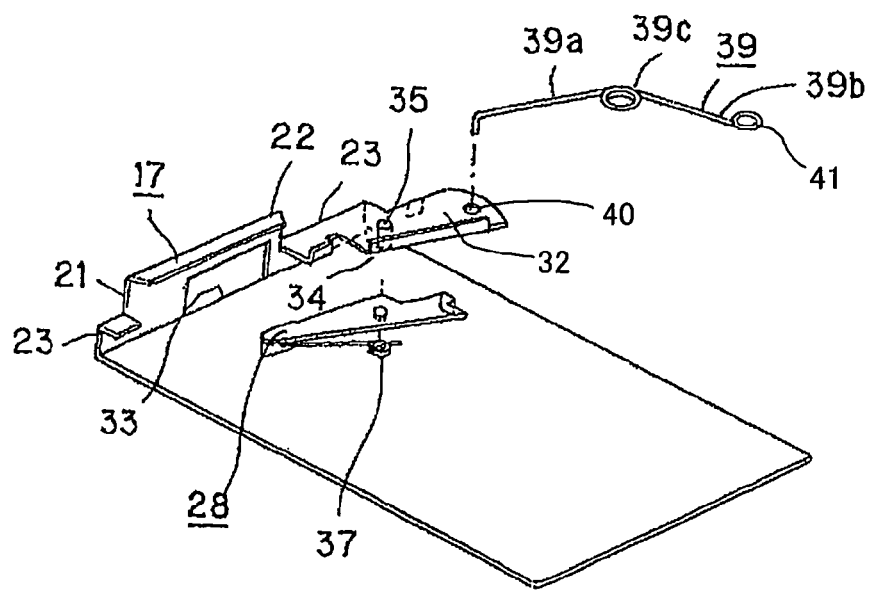
FIG. 5 is also a perspective view of the shutter member and a shutter member locking mechanism installed to the shutter member.

As shown in FIGS. 4 and 5, the supporting portion 17 of the shutter member 15 includes a coupling portion 21 formed to rise vertically from the base end of the shutter portion 16, and a first engagement portion 22 formed along the top of the coupling portion 21 to overhang the shutter portion 16. The coupling portion 21 has provided on either side thereof a second engagement portion 23 formed in an "L" shape at a level one step lower than the first engagement portion 22. It should be noted that the second engagement portion 23 is bent to have the "L" shape and overhang the shutter portion 16 in the same direction as the first engagement portion 22.

Figure 6:
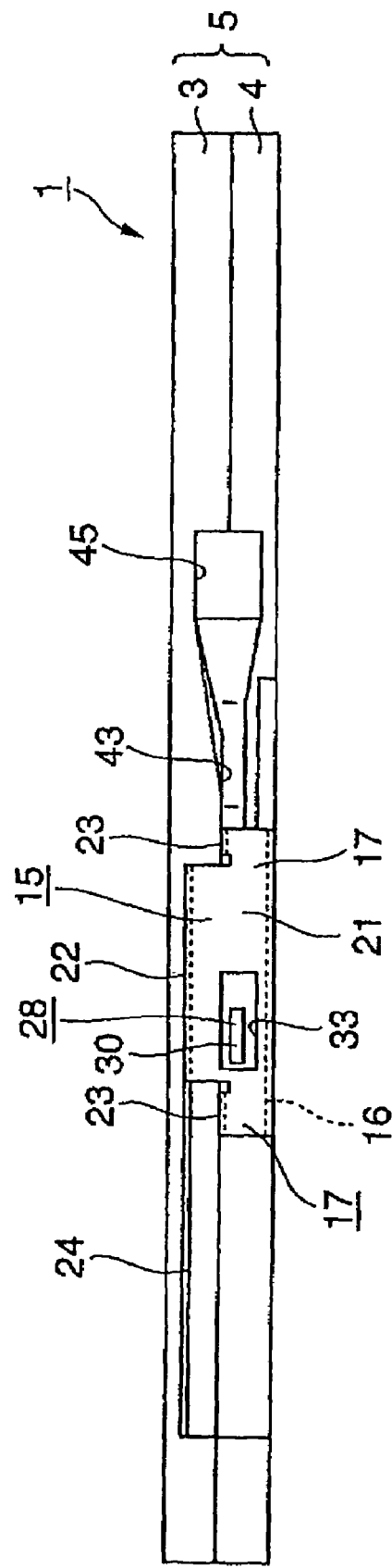
FIG. 6 is a side elevation of the disk cartridge according to the present invention, showing the side of the disk cartridge at which the shutter member is installed.
Figure 7:
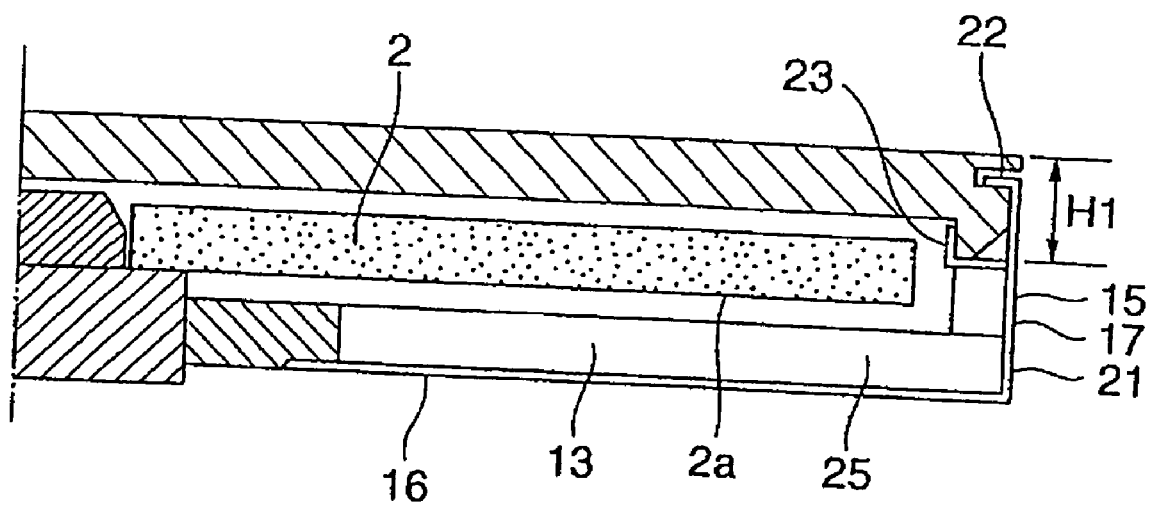
FIG. 7 is a sectional view showing the shutter member installed to the cartridge body.

As shown in FIG. 2, the shutter member 15 is disposed in the cartridge body 5 to extend at the shutter portion 16 thereof over the head opening 13. As also shown in FIGS. 6 and 7, the shutter member 15 has the first engagement portion 22 formed atop the supporting portion 17 thereof engaged in an engagement recess 24 formed in the sliding guide portion 18 being the lateral side of the upper half 3, and the L-shaped second engagement portion 23 engaged on a guide rail portion of the sliding guide portion 18. Namely, a guide rail portion of the sliding guide portion 18 is thus caught by the first and second engagement portions 22 and 23 to support the supporting portion 17 and hence the shutter member 15. The shutter member 15 thus supported is guided on the sliding guide portion 18 to move in the direction of arrow A or B in FIG. 2 to uncover or cover the head opening 13.

Note that a shutter sliding concavity 19 is formed in a region where the shutter portion 16 in the lower half 4 is moved. The shutter sliding concavity 19 is formed sufficiently deep for the shutter portion 16 not to protrude from the surface of the cartridge body 5.

The disk cartridge 1 according to the present invention is open having a cut 25 formed in a portion, opposite to the head opening 13, of the rising peripheral wall 4a of the lower half 4 as shown in FIGS. 4 and 7. That is, the head opening 13 is formed to extend from the inner radius to the outer radius of the cartridge body 5.

Also, a portion, opposite to at least the head opening 13, of the sliding guide portion 18 of the upper half 3 is formed to have such a height H1 that it will not be lower than the lower side 2a of an optical disk 2, opposite to the lower half 4 as shown in FIG. 7 when the optical disk 2 in the disk cartridge 1 set leveled on the cartridge mount in the disk drive unit is mounted in place on the turn table.

In the disk cartridge 1 constructed as above, when the shutter member 15 is moved to uncover the head opening 13, the optical pickup as a head to read information signals recorded in the optical disk 2 cannot only be positioned as a whole in the cartridge body 5 but also the other optical block can be positioned outside the cartridge body 5 with positioning, in the cartridge body 5, of the objective lens focusing a light beam which scans the signal recording area of the optical disk 2 as will be described in detail later when the optical pickup is moved to a position for scanning along the outer radius of the optical disk 2.

Thus, since the disk cartridge 1 according to the present invention permits to position the optical pickup between the inner and outer radii of the cartridge body 5 while allowing the optical pickup to approach the optical disk 2, so a signal recording area can be formed to extend to the outer radius of the optical disk 2 thereby increasing the recording capacity of the optical disk 2. Further, since the disk cartridge 1 permits the optical pickup to approach the optical disk 2, an objective lens having a larger numerical number (NA) can be used to define a smaller spot of a light beam focused on the signal recording area of the optical disk 2 thereby writing information signals to the optical disk 2 with an improved recording density. Also, since both the recording capacity and density can be improved as above, the optical disk 2 having only a predetermined recording capacity may be designed to have a reduced radius. Moreover, since the disk cartridge 1 permits to scan the optical disk 2 with the optical pickup being positioned between the inner and outer radii of the cartridge body 5, so the cartridge body 5 itself may be designed more compact and hence the disk drive unit compatible with the disk cartridge 1 may be designed more compact.

In the disk cartridge 1 according to the present invention, the shutter member 15 which covers and uncovers the head opening 13 is installed to be movable along the flat lateral side 8 of the cartridge body 5 as shown in FIGS. 1 and 2. Therefore, since the supporting portion 17 is movable linearly along the flat lateral side 8, the shutter member 15 can be moved stably.

Also, since the head opening 13 is formed in a position opposite to the flat lateral side 8 of the cartridge body 5, the portion of the lower half 4, where the cut 25 is formed, is straight. Therefore, even with the head opening 13 being open at the portion, where the cut 25 is formed, of the lateral side 8 of the cartridge body 5, the head opening 13 is generally rectangular and thus can positively be closed by the shutter member 15 including the supporting portion 17 having a linear horseshoe-shaped section.

Figure 8:
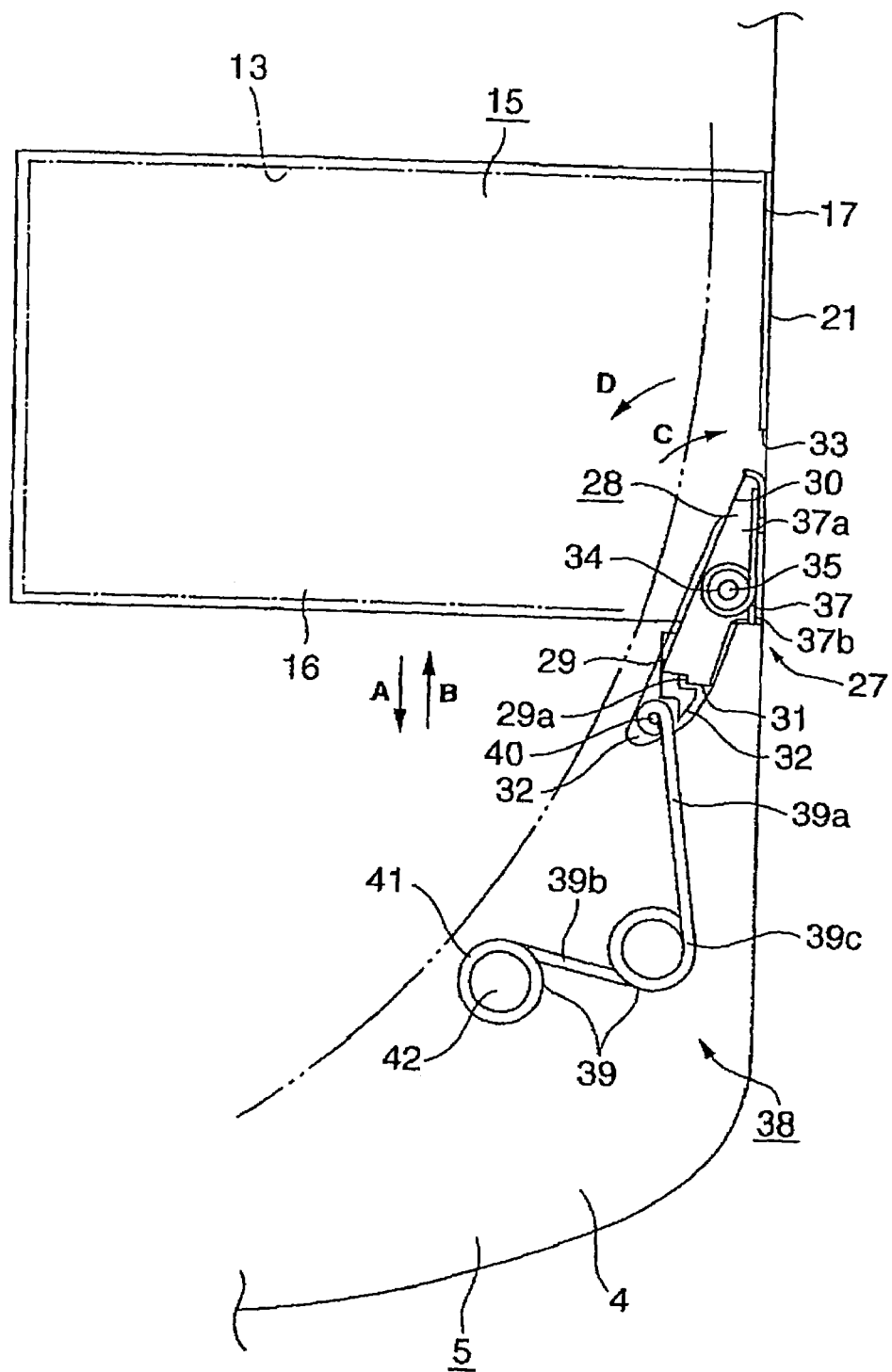
FIG. 8 is a plan view showing the shutter member being locked by the shutter member locking mechanism.

The disk cartridge 1 according to the present invention includes a locking mechanism 27 which locks the shutter member 15 from moving when the latter has been moved to a position to cover the head opening 13. As shown in FIGS. 5 and 8, the locking mechanism 27 for the shutter member 15 includes a locking lever 28 pivotably installed on the shutter member 15, and an engagement member 29 provided at the cartridge body 5 and which is engaged on the lock lever 28.

As shown in FIGS. 5 and 8, the locking lever 28 includes a to-be-pushed portion 30 formed upright along one lateral edge at one end of the locking lever 28 and an engagement portion 31 formed upright at the other end and which is to engage on the engagement member 29. The rising engagement portion 31 is an elongated plate. The locking lever 28 is pivotably installed to a locking lever fixture 32 provided on the shutter member 15. The locking lever fixture 32 is formed to project from the upper end of the coupling portion 21 of the supporting portion 17 of the shutter member 15 to the lateral side of the shutter portion 16.

As shown in FIGS. 1, 6 and 8, the locking lever 28 has a pivoting hole 34 formed nearly in the center thereof, and is fitted through the pivoting hole 34 on an upright pivot shaft 35 provided upright on the locking lever fixture 32 with the to-be-pushed portion 30 formed at the one end being directed toward a rectangular window 33 formed nearly in the center of the coupling portion 21. Thus, the locking lever 28 is pivotable about the pivot shaft 35. The engagement portion 31 formed at the other end of the locking lever 28 is projected along the locking lever fixture 32 to the lateral side of the shutter portion 16.

Note here that in the window 33 formed in the coupling portion 21 of the shutter member 15, there will be engaged a spring provided at the disk drive unit in which the disk cartridge 1 is to be inserted to limit the movement of the shutter member 15.

The locking lever 28 supported on the shutter member 15 is forced by a turning drive spring 37 wound on the pivot shaft 35 to turn in the direction of arrow C in FIG. 8 in which the to-be-pushed portion 30 is projected from the window 33. More specifically, the turning drive spring 37 is formed from a return helical spring to have two arm portions 37a and 37b. The turning drive spring 37 has the arm portions 37a engaged on the to-be-pushed portion 30 and the other arm portion 37b engaged inside the coupling portion 21 of the shutter member 15 to force the locking lever 28 for turning in the direction of arrow C in FIG. 8.

Note that the locking lever 28 has the one end thereof, where the to-be-pushed portion 30 is formed, put in abutment with the coupling portion 21 and is thus limited from being turned under the action of the turning drive spring 37.

The shutter member 15 having the locking lever 28 fixed thereon as above is pivotably installed to the cartridge body 5 with the supporting portion 17 thereof being supported on the upper half 3 as having previously been illustrated and explained.

While the shutter member 15 is covering the head opening 13 as shown in FIGS. 6 and 8, the locking lever 28 is forced by the turning drive spring 37 to turn in the direction of arrow C in FIG. 8 thereby putting the to-be-pushed portion 30 into the window 33 formed in the coupling portion 21. At this time, the engagement portion 31 formed at the other end is engaged by the locking lever 28 onto the engagement member 29 formed on the cartridge body 5 to limit the movement of the shutter member 15 and keep covering the head opening 13 with the shutter portion 16.

In the cartridge body 5, the engagement member 29 is provided in a position on the inner surface of the lower half 4, which is outside the disk compartment 6 and where the engagement portion 31 of the locking lever 28 can be engaged on the engagement member 29 when the shutter member 15 is covering the head opening 13. The engagement member 29 is formed integrally with the lower half 4. The engagement member 29 has formed therein an engagement concavity 29a which is open at one side thereof and in which the engagement portion 31 of the locking lever 28 is engaged.

Figure 19:
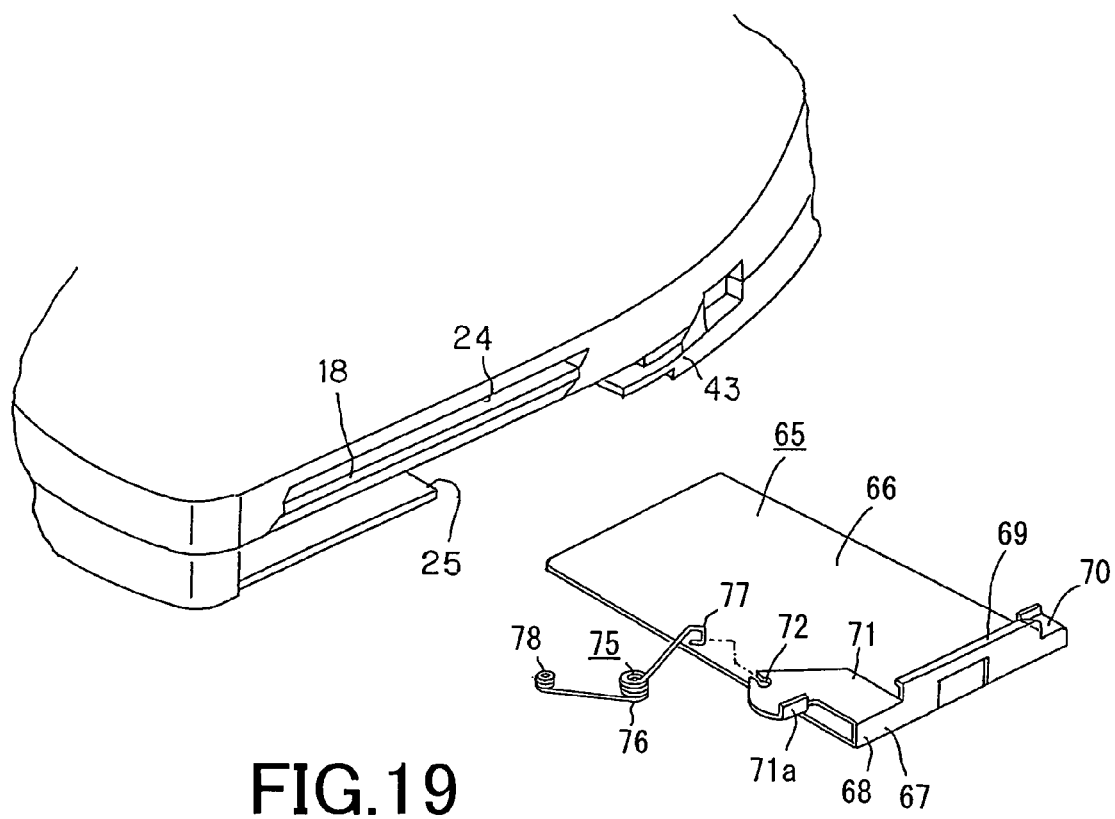
FIG. 19 is a perspective view of a variant of the shutter member of the disk cartridge according to the present invention and a cartridge body supporting the shutter member.

When the disk cartridge 1 is inserted into a disk drive unit, the locking lever 28 locking the shutter member 15 in a position to cover the head opening 13 will be pushed at the to-be-pushed portion 30 thereof by the shutter member movement limiting spring entering, and engaged in, the window 33 formed in the coupling portion 21 to turn in the direction of arrow D in FIG. 8 against the force of the turning drive spring 37. When the locking lever 28 is thus turned in the direction of arrow D in FIG. 8, the engagement portion 31 thereof will be disengaged from the engagement concavity 29a of the engagement member 29, and the shutter member 15 is thus unlocked and can be moved in the direction of arrow A in FIG. 2 to uncover the head opening 13, as shown in FIG. 19.

Note here that the head opening 13 is covered and uncovered as the shutter member 15 is moved relatively to the cartridge body 5. The covering and uncovering of the head opening 13 will be described in detail later.

Since the locking lever 28 to lock the shutter member 15 in the position to cover the head opening 13 is fixed to the shutter member 15 which is moved in relation to the cartridge body 5, the aforementioned shutter member locking mechanism 27 can be moved together with the shutter member 15 as the latter covers and uncovers the head opening 13. Thus, since the locking lever 28 can be positioned with at least the to-be-pushed portion 30 thereof being positioned over the head opening 13 when the shutter member 15 is covering the head opening 13, the disk cartridge 1 can be designed compact. That is, in case the locking lever 28 is provided at the cartridge body 5, a space in which the entire locking lever 28 is disposed has to be provided at the cartridge body 5. However, the disc cartridge 1 according to the present invention needs no such space and it suffices to provide only the engagement member 29 in which a part of the locking lever 28 is engaged. So, the cartridge body 5 can be designed more compact.

Note here that in the disk cartridge 1 according to the present invention, there is provided a two-way forcing mechanism 38 to positively move the shutter member 15 which covers and uncovers the head opening 13 and hold the shutter member 15 in a position to uncover or cover the head opening 13. The two-way forcing mechanism 38 functions to moving the shutter member 15 to a position to uncover or cover the head opening 13 correspondingly to a moved position of the shutter member 15, relative to the cartridge body 5. It forms a shutter operating mechanism.

The two-way forcing mechanism 38 includes a two-way forcing member which moves the shutter member 15 in any selected one of two directions to uncover and cover the head opening 13. More specifically, the two-way forcing member is a return helical spring 39 as shown in FIG. 8. The return helical spring 39 is provided between the shutter member 15 and cartridge body 5. The return helical spring 39 is disposed in a position which covers the head opening 13 when the shutter member 15 arrives at that position, as shown in FIG. 8. More particularly, the return helical spring 39 is located upstream of the moving direction of the shutter member 15. In this position, the shutter member 15 covers the head opening 13 and it is moved from this position toward a position to uncover the head opening 13.

Note here that when the shutter member 15 is moved upstream of its moving direction, it will leave the head opening 13. On this account, the two-way forcing mechanism 38 is provided upstream of the moving direction of the shutter member 15 to prevent the return helical spring 39 included in the two-way forcing mechanism 38 from being protruded into the head opening 13. Thus, the head opening 13 can be widely uncovered by the shutter member 15.

In the disk cartridge 1 according to the present invention is, the rear corner thereof opposite to the front end at which the disk cartridge 1 is first inserted into a disk drive unit is upstream of the moving direction of the shutter member 15. This rear corner of the disk cartridge 1 provides a sufficient space to efficiently dispose the two-way forcing mechanism 38 inside the cartridge body 5.

The return helical spring 39 included in the two-way forcing mechanism 38 is installed with the end of one arm portion 39a thereof being engaged in an engagement hole 40 formed in the end portion of the locking lever fixture 32 and an annular portion 41 formed at the one of the other arm portion 39b thereof being engaged on an upright supporting pin 42 provided on the inner surface of the cartridge body 5.

Figure 10:
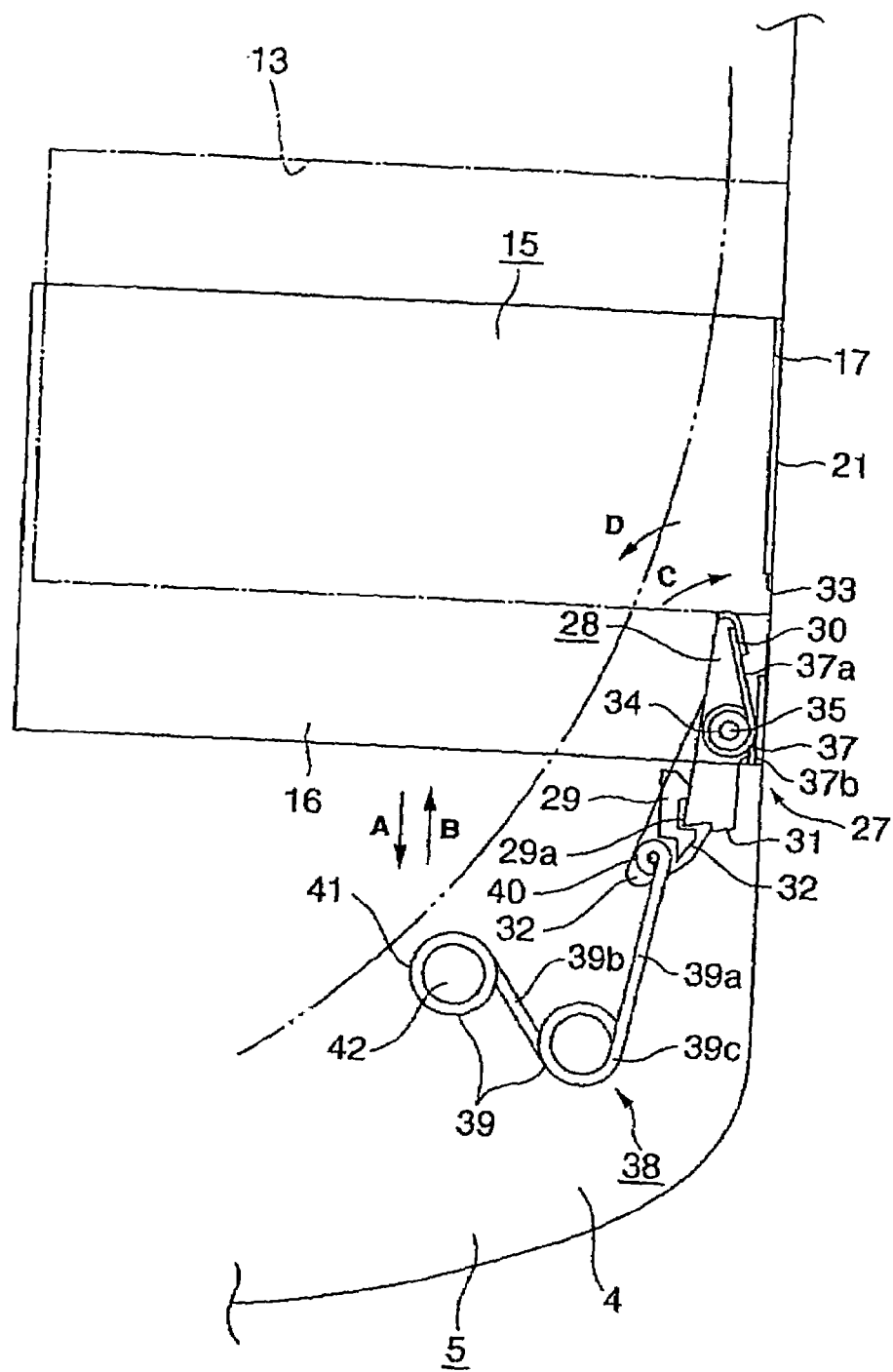
FIG. 10 is a plan view showing the shutter member being moved in a direction to uncover a head opening.
Figure 11:
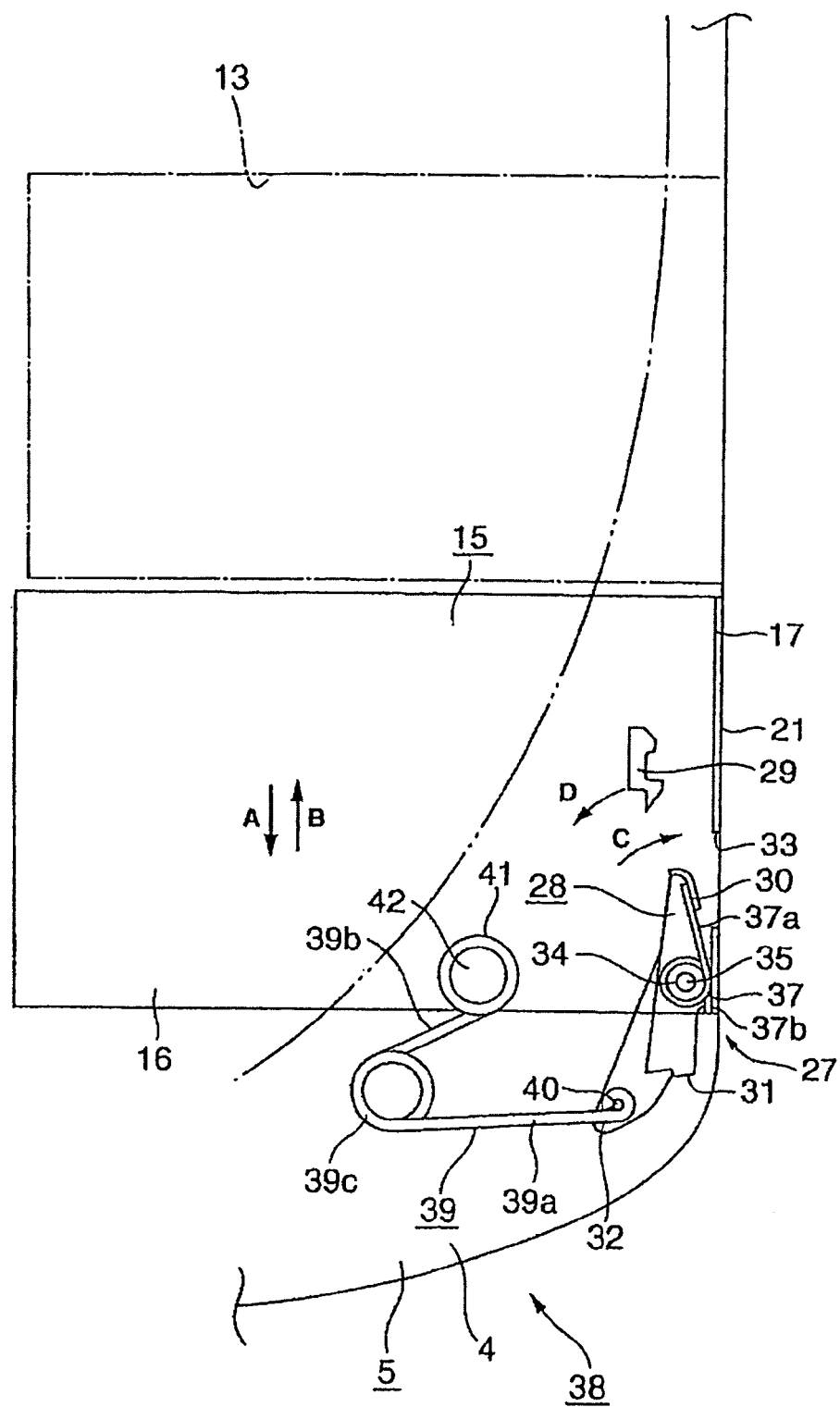
FIG. 11 is a plan view showing the shutter member having been moved to a position to uncover the head opening to the full extent.
Figure 12:
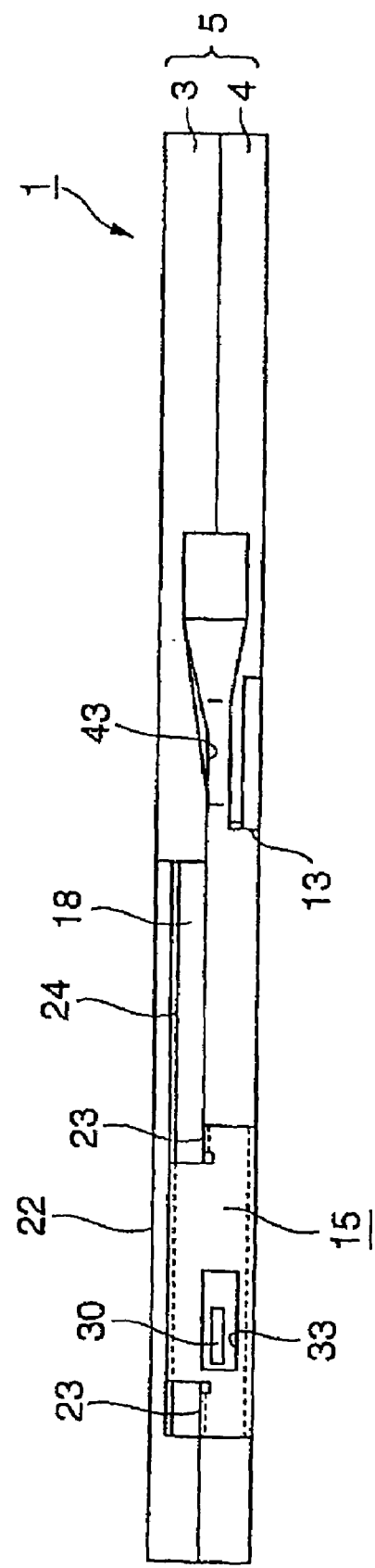
FIG. 12 is a side elevation of the disk cartridge, showing the head opening being uncovered.

When the shutter member 15 is in the position to cover the head opening 13, the return helical spring 39 forces the shutter member 15 in the direction of arrow B in FIG. 8 to keep covering the head opening 13. As the shutter member 15 released from locking by the shutter member locking mechanism 27 is moved in relation to the cartridge body 5 in the direction of arrow A in FIG. 8 to uncover the head opening 13 after the disk cartridge 1 is inserted into place in the disk drive unit, a coil portion 39c, formed at a center not fixed, of the return helical spring 39 will be moved in the direction of arrow A in which the shutter member 15 will also be moved. When the coil portion 39c is further moved in the direction of arrow A and finally goes over the position of the supporting pin 42 located in a position toward which the shutter member 15 will be moved as shown in FIG. 10, the return helical spring 39 will start forcing in an opposite direction. When the forcing direction is reversed, the return helical spring 39 will force the shutter member 15 to move in the direction of arrow A in FIG. 10 to uncover the head opening 13 as shown in FIGS. 11 and 12 and will hold the shutter member 15 in the position to uncover the head opening 13.

When an eject operation is made at the disk drive unit to eject the disk cartridge 1 in which the shutter member 15 is held in the position to uncover the head opening 13, the shutter member 15 will be moved in relation to the cartridge body 5 in the direction of arrow B in FIG. 10 and the central coil portion 39c of the return helical spring 39 is also moved in the same direction of arrow B. When the shutter member 15 is further moved in the direction of arrow B and the coil portion 39c finally goes over the position of the supporting pin 42 located in the position toward which the shutter member 15 will be moved, the return helical spring 39 will start forcing in an opposite direction. When the forcing direction is reversed, the return helical spring 39 will force the shutter member 15 in the direction of arrow B in FIG. 9, thus move the shutter member 15 in the direction to cover the head opening 13 and hold the shutter member 15 in the position to cover the head opening 13.

The shutter member 15 forced by the return helical spring 39 included in the two-way forcing mechanism 38 is held in each of the positions to cover and uncover the head opening 13 under the action of the return helical spring 39. Thus, the shutter member 15 can be held to positively cover or uncover the head opening 13.

The disk drive unit compatible with this disk cartridge 1 does not need any mechanism to hold the shutter member 15 in a position to uncover the head opening 13 against the force of a forcing member. So, the disk drive unit can be designed more simple in mechanism and more compact.

Further, in the disk cartridge 1 according to the present invention, since the shutter member 15 is moved by the two-way forcing mechanism 38 in the direction to uncover or cover the head opening 13 formed in the cartridge body 5 correspondingly to its position relative to the head opening 13, so the head opening 13 can positively be uncovered or covered in connection with insertion or rejection of the disk cartridge 1 into or from the disk drive unit.

Moreover, in the disk cartridge 1, he shutter member 15 is forced by the two-way forcing mechanism 38 to move in the direction to uncover the head opening 13. Thus, it is not necessary to provide any over-stroke area for moving the shutter member 15 to the position to uncover the head opening 13. The area for moving the shutter member 15 may be smaller and thus the disk cartridge 1 itself can be designed more compact.

In the aforementioned disk cartridge 1, the shutter member locking mechanism 27 is provided to hold the shutter member 15 in the position to cover the head opening 13. However, there may be provided only the two-way forcing mechanism 38. By providing the shutter member locking mechanism 27, it is possible to more positively prevent the shutter member 15 from being moved to inadvertently uncover the head opening 13 while the disk cartridge 1 is not in use, for example, during storage of the disk cartridge 1. Thus, the optical disk 2 housed in the disk cartridge 1 can be protected positively.

Also, in the disk cartridge 1 according to the present invention, there in formed in one (8) of the lateral sides of the cartridge body 5, at which the shutter member 15 is provided, a guide recess 43 the shutter member releasing member provided at the disk drive unit enters, as shown in FIGS. 1, 6 and 12.

Also, there are provided on the bottom of the cartridge body 5 and at both sides of the curved rear end portion 10 first and second positioning holes 48 and 49 in which positioning pins provided at the disk drive unit are engaged, as shown in FIGS. 2 and 3. It should be noted that the positioning hole 49 is formed as an elongated hole whose width-directional diameter perpendicular to the moving direction of the shutter member 15 is taken as the major axis in order to adjust the engagement position of the positioning pin.

Also, at the opposite lateral sides 8 and 9 of the circular front end portion 7 of the cartridge body 5, there are provided loading engagement concavities 45 and 46, respectively, in which there is engaged a part of the cartridge loading mechanism provided at the disk drive unit in which the disk cartridge 1 is inserted, as shown in FIGS. 1 and 2.

Further, at a part of the circular front end portion 7, located at the other lateral side 9 of the cartridge body 5, there is provided an injecting engagement concavity 47 in which a part of an ejecting mechanism provided at the disk drive unit is engaged, as shown in FIG. 3.

Furthermore, on the lateral sides 8 and 9, or on the bottom, of the cartridge body 5, there are formed an identification hole and identification concavity for identification of the type of an optical disk 2 which is housed into the disk cartridge 1.

Next, an example of the disk drive unit compatible with the aforementioned disk cartridge 1 will be illustrated and explained.

Figure 13:
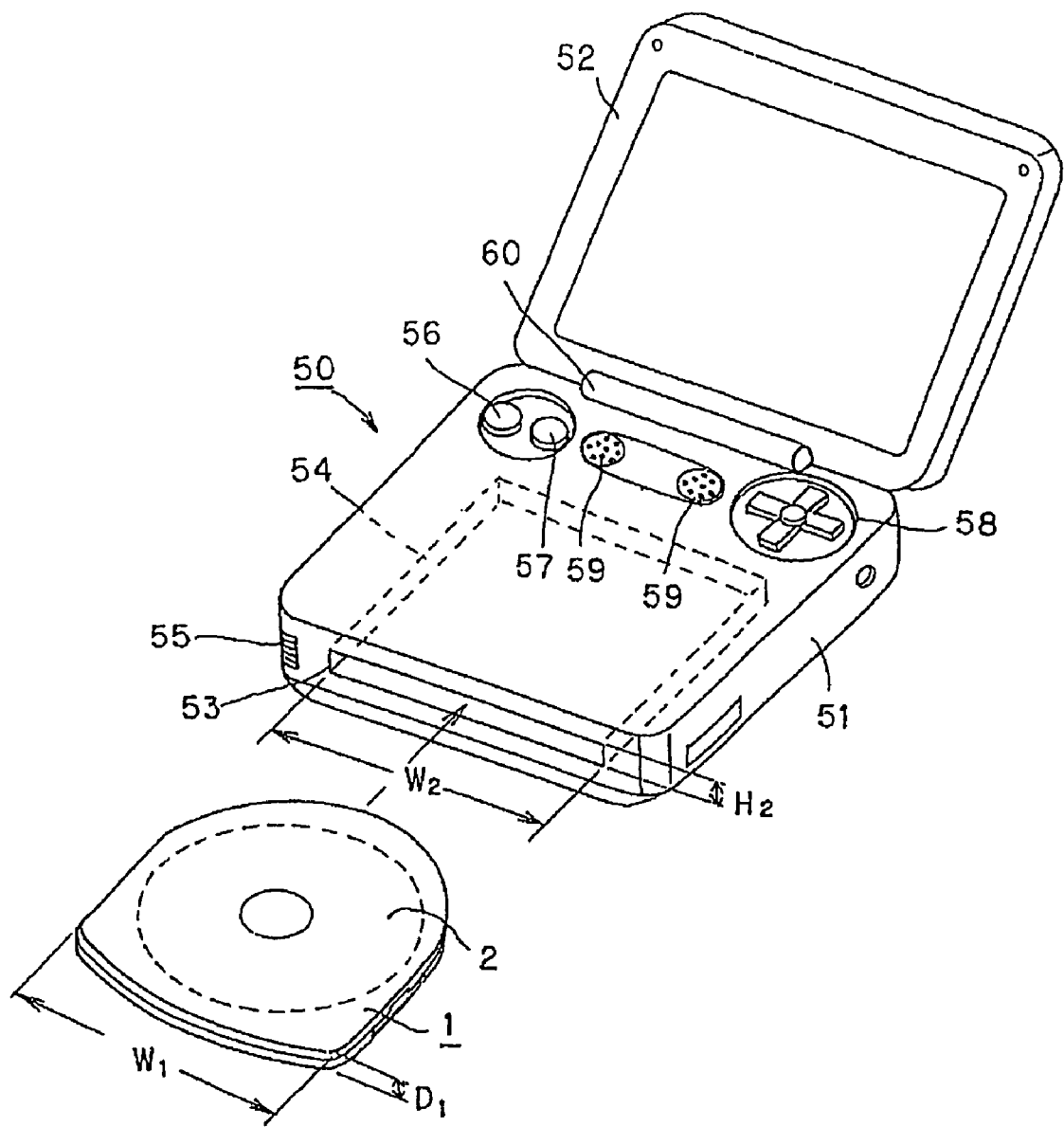
FIG. 13 is a perspective view of an example of the disk drive unit with which the disk cartridge according to the present invention is to be used.

The disk cartridge 1 according to the present invention houses an optical disk 2 having recorded therein program data and video data intended for playing a video game, for example. As shown in FIG. 13, a disk drive unit, generally indicated with a reference numeral 50, compatible with the disk cartridge 1 housing an optical disk 2 of such a type as in the present invention, includes a unit body 51 incorporating a disk drive which reads at least data recorded in the optical disk 2 in the disk cartridge 1 inserted therein, and a display unit 52 to display image data and character data read from the optical disk 2.

The disk drive unit 50 shown in FIG. 13 has provided in the unit body 51 incorporating the disk drive a cartridge loading mechanism (not shown) including a cartridge holder 54 to set the disk cartridge 1 onto the disk drive. At the front side forming one lateral side of the unit body 51, there is provided a cartridge slot 53 through which the disk cartridge 1 is inserted into the cartridge holder and the disk cartridge 1 set on the cartridge holder 54 is ejected. The cartridge slot 53 is formed to have a sufficient size to insert and eject the disk cartridge 1. It has a rectangular shape whose width W2 is slightly larger than the width W1 of the disk cartridge 1 to be inserted through the cartridge slot 53 and height H2 is a little larger than the thickness D1 of the disk cartridge 1. In the unit body 51, the cartridge holder 54 is disposed opposite to the cartridge slot 53.

The unit body 51 has provided at one side of the front end face thereof an eject button 55 to eject the disk cartridge 1 held in the cartridge holder 54.

Also, the unit body 51 has provided at one side of the upper side thereof control buttons 56 and 57 used to play a video game, for example, and at the other side a control key 58 to scroll an image displayed on the display unit 52. Also on the upper side of the unit body 51, there is provided a speaker 59 to emit audio signals reproduced from the optical disk 2.

The unit body 51 has provided thereon control buttons for controlling the disk drive, such as a read button, and a power on/off button, etc.

The display unit 52 is provided at the rear end of the unit body 51, opposite to the front end where the cartridge slot 53 is formed. The display unit 52 is pivotably installed to the unit body 51 by a hinge mechanism 60. The display unit 52 is pivotably be installed to the unit body 51 and thus closable to the upper side of the unit body 51. The display unit 52 is formed from a liquid crystal display panel.

Next, loading the disk cartridge 1 according to the present invention into the disk drive unit 50 constructed will be described below:

The disk cartridge 1 is loaded into the disk drive unit 50 with the circular front end portion 7 thereof being first introduced into the cartridge slot 53 as shown in FIG. 13. It is thus inserted into the unit body 51 and held in the cartridge holder 54.

Note here that since the disk cartridge 1 according to the present invention has the portion thereof to first be inserted into the cartridge slot 53 as the generally circular front end portion 7, even if the disk cartridge 1 is inserted with the longitudinal axis P2 thereof being largely inclined in relation to the longitudinal axis P1 of the cartridge slot 53, the disk cartridge 1 can smoothly be inserted into the cartridge slot 53 and positively held in the cartridge holder 54.

Figure 14:
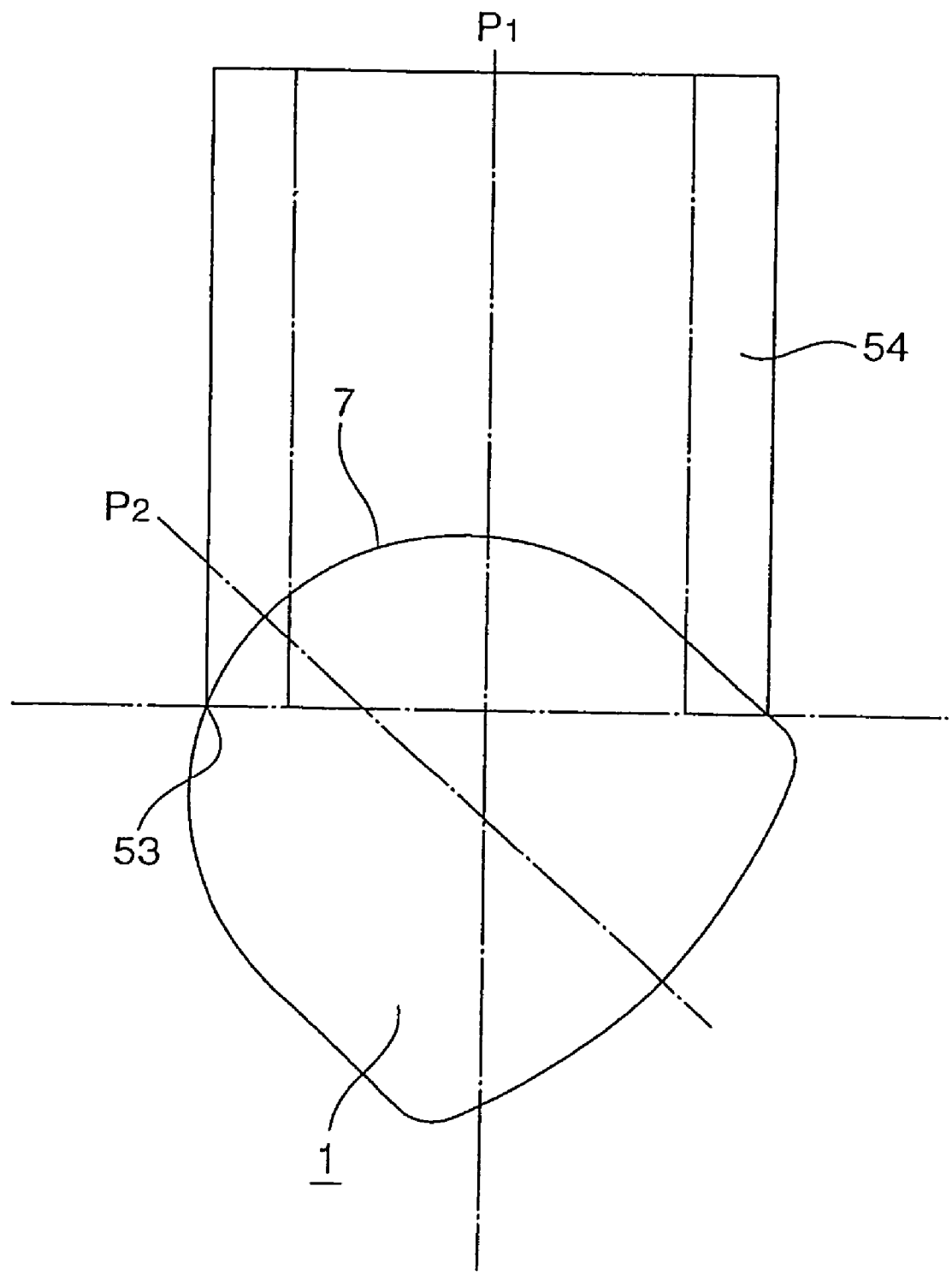
FIG. 14 is a plan view showing the disk cartridge being inserted obliquely into a cartridge slot in the disk drive unit.
Figure 15:
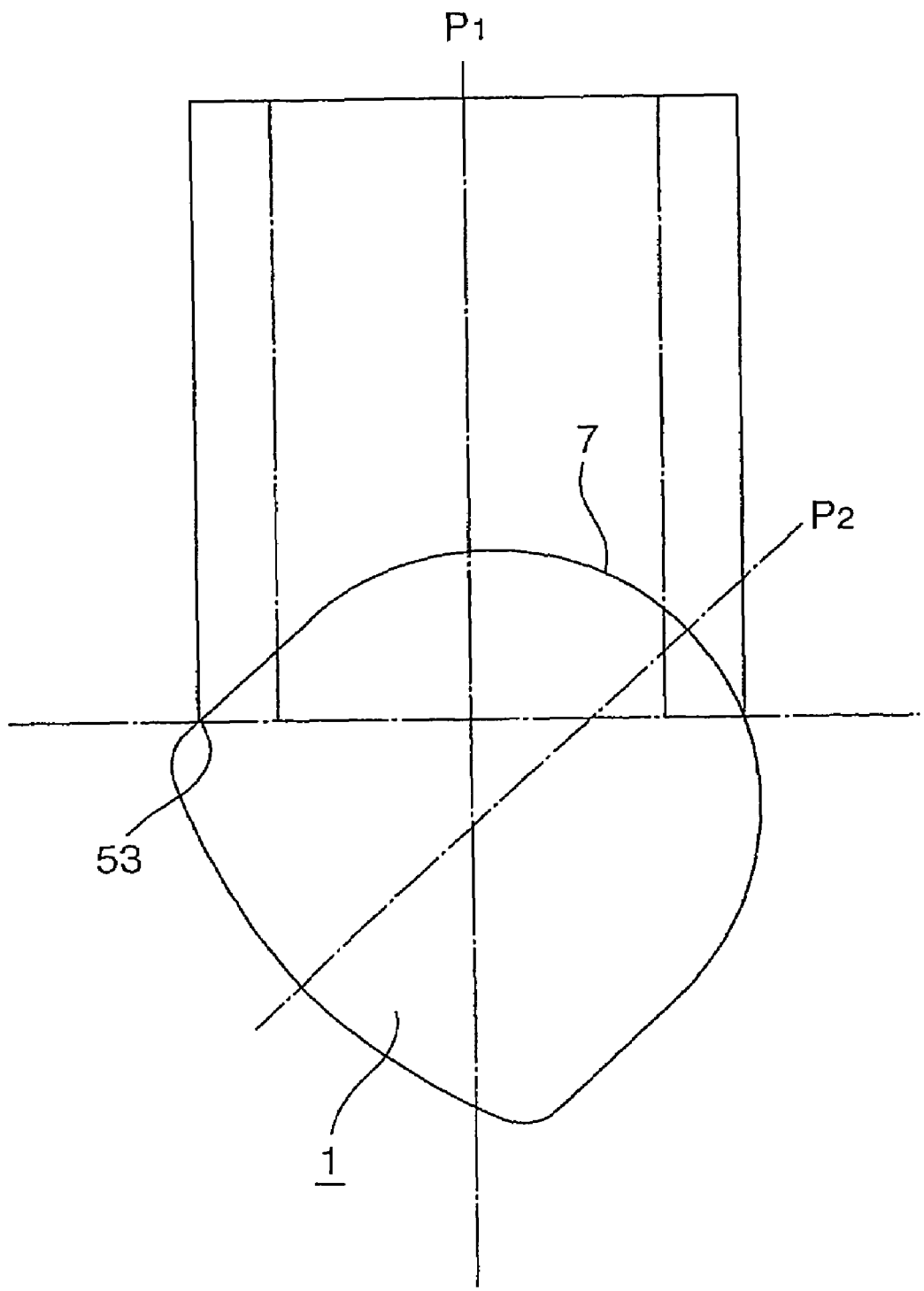
FIG. 15 is also a plan view showing the disk cartridge being inserted in any other direction into the cartridge slot in the disk drive unit.
Figure 16:
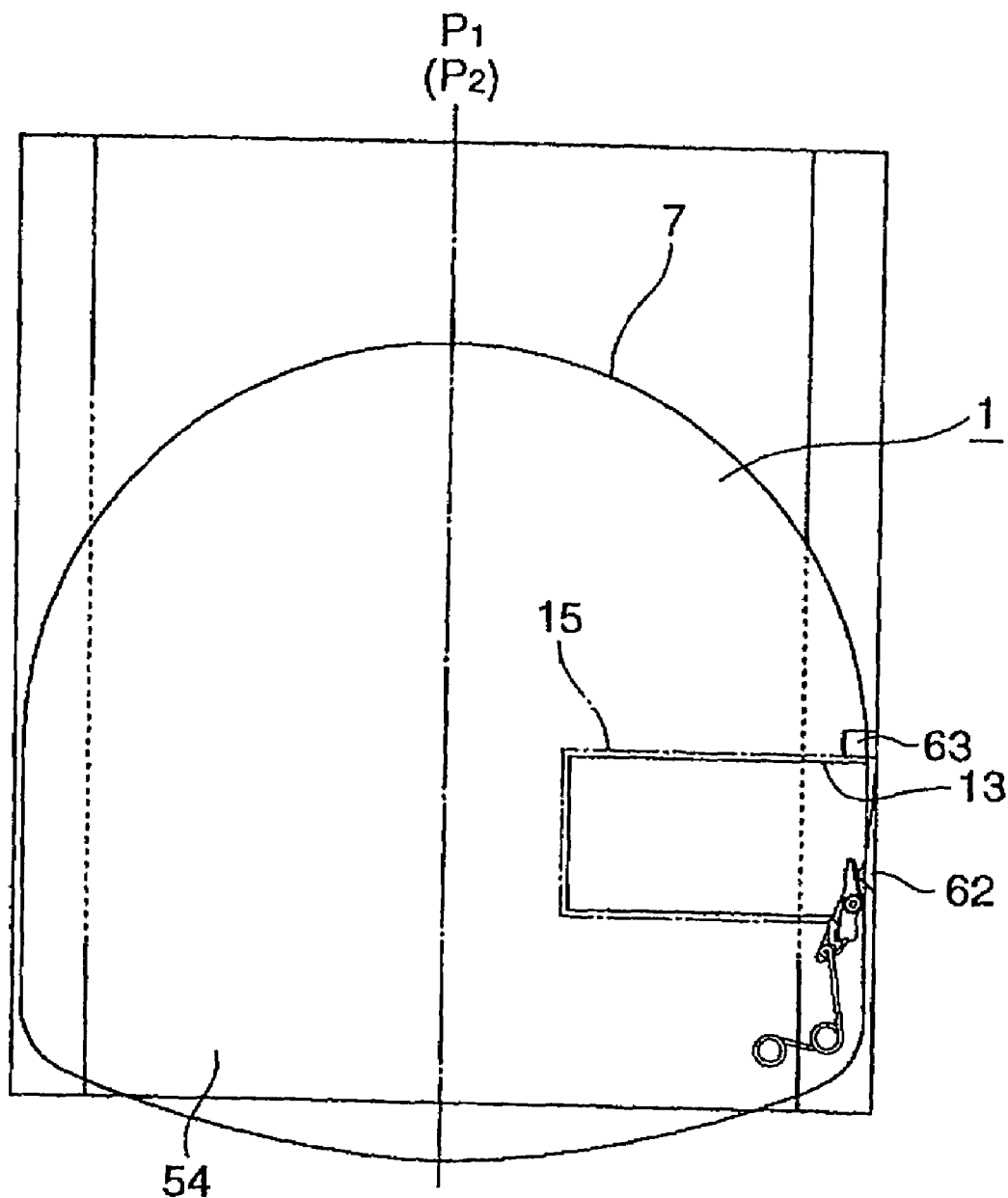
FIG. 16 is a plan view showing the disk cartridge inserted under the posture control in a cartridge holder.

More specifically, since the disk cartridge 1 has the generally circular front end portion 7, even if it is inserted into the cartridge slot 53 with the longitudinal axis P2 thereof being inclined rightward or leftward to about 45 degrees in relation to the longitudinal axis P1 of the cartridge slot 53, the circular front end 7 can be inserted deeply into the unit body 51 of the disk drive unit as will be known from FIG. 14 or 15. In this case, however, in the course of being inserted into the cartridge slot 53, the disk cartridge 1 can be turned about a part of the circular front end portion 7 abutting one of the side walls of the cartridge slot 53 in a direction in which the longitudinal axes P1 and P2 will coincide with each other as shown in FIG. 16. Thus, the disk cartridge 1 according to the present invention can positively be put into the cartridge holder 54 even it is inserted into the cartridge slot 53 in a largely inclined direction.

Figure 17:
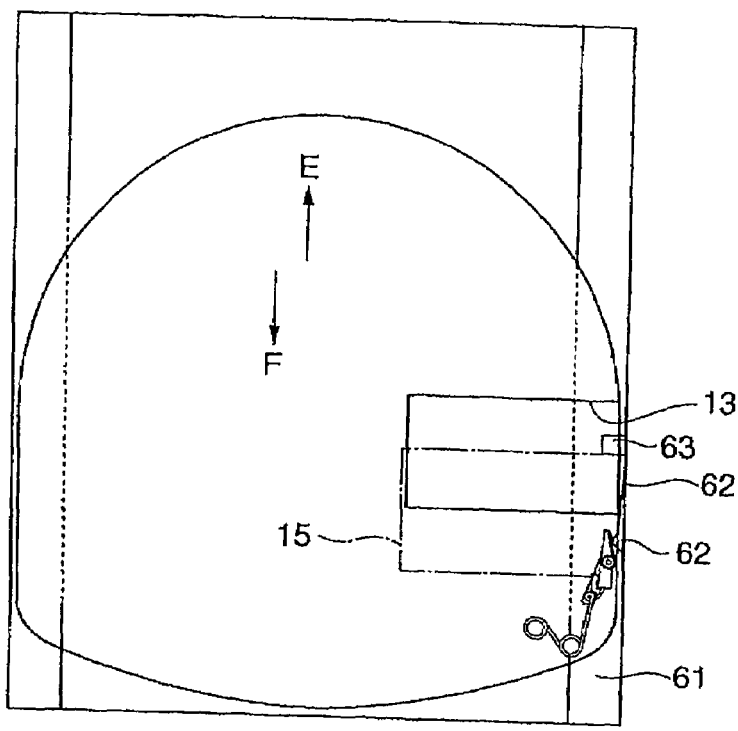
FIG. 17 is a plan view showing the disk cartridge inserted in the cartridge holder and the shutter member unlocked.

Then, when the disk cartridge 1 once inserted in the cartridge holder 54 is further inserted deeper, the shutter member 15 is moved in relation to the cartridge body 5 until it uncovers the head opening 13. More specifically, when the disk cartridge 1 has been inserted halfway into the cartridge holder 54 as shown in FIG. 17, a part of a shutter member movement limiting spring 62 formed by cutting and erecting a part of the lateral wall of a cartridge support 61 provided at one side of the cartridge holder 54 and having an L-shaped section will enter the window 33 formed in the coupling portion 21 of the shutter member 15 and push the to be-pushed portion 30 to turn the locking lever 28 in the direction of arrow D in FIG. 9 as mentioned above. When the locking lever 28 is thus turned in the direction of arrow D in FDIG. 9, it will be disengaged from the engagement member 29 of the engagement portion 31 to unlock the shutter member 15 from the cartridge body 5. When the shutter member 15 is unlocked from the cartridge body 5, it will be movable in relation to the cartridge body 5.

The cartridge holder 54 into which the disk cartridge 1 according to the present invention is inserted further includes a shutter releasing piece 63. The shutter releasing piece 63 is provided in a position where it will enter the guide recess 43 formed in one (8) of the lateral sides of the cartridge body 5 and abut one side of the shutter member 15 when the disk cartridge 1 has been inserted to a position to unlock the shutter member 15.

Figure 18:
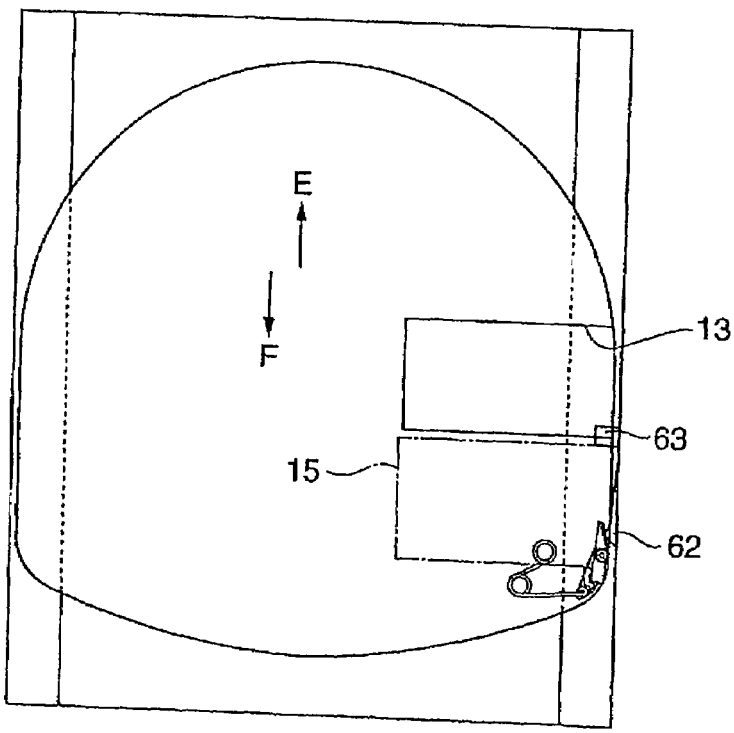
FIG. 18 is a plan view showing the head opening uncovered with the shutter member having been moved with the disk cartridge inserted in the cartridge holder.

When the disk cartridge 1 has been inserted into the cartridge holder 54 to a position to unlock the shutter member 15, the shutter releasing piece 63 will abut one side of the shutter member 15 as shown in FIG. 17 to limit the movement of the shutter member 15 in relation to the cartridge body 5. When the disk cartridge 1 is further inserted deeper into the cartridge holder 54 in the direction of arrow E from the position shown in FIG. 17, the cartridge body 5 will be moved in the direction of arrow E and the head opening 13 be uncovered as shown in FIG. 18.

Figure 9:
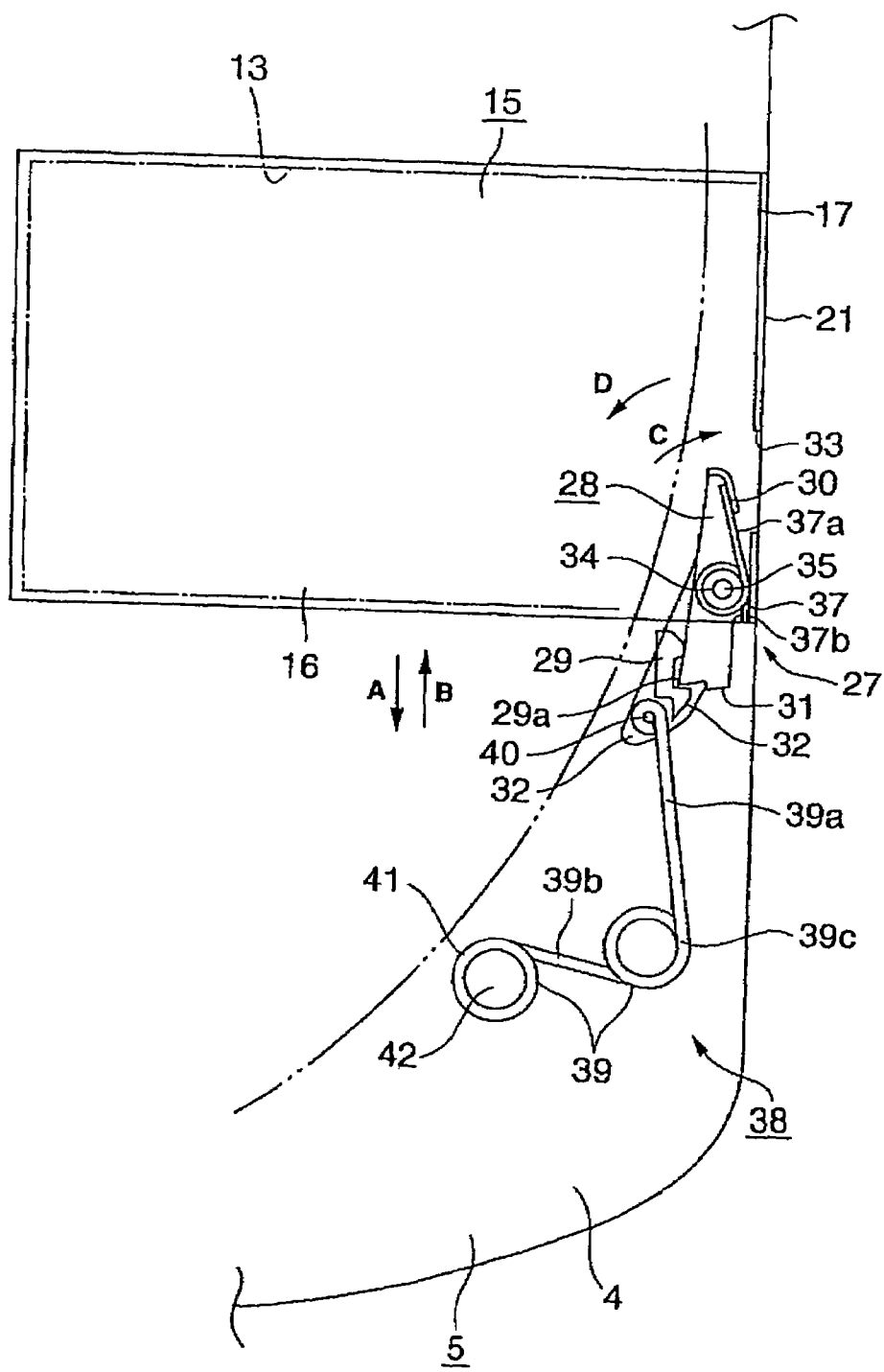
FIG. 9 is also a plan view showing the shutter member being unlocked.

In the disk cartridge 1, when the cartridge body 5 is moved in the direction of arrow E in FIG. 17 to uncover the head opening 13 with the shutter member 15 being limited from moving, the return helical spring 39 included in the two-way forcing mechanism 38 will be biased as shown in FIGS. 9 and 10. When the cartridge body 5 has been moved in the direction of arrow E in FIG. 17 and the coil portion 39c of the return helical spring 39 has been biased to a position beyond the supporting pin 42 located at the side where the shutter member 15 is movable, the return helical spring 39 will start forcing in an opposite direction and move the shutter member 15 in the direction of arrow F in FIG. 17 opposite to the moving direction of the cartridge body 5 to uncover the head opening 13 as shown in FIGS. 11, 12 and 18. At this time, since the shutter member 15 is forced by the return helical spring 39 to uncover the head opening 13, the latter can positively be kept uncovered.

With the above operations, the head opening 13 is uncovered, the disk cartridge 1 inserted in the cartridge holder 54 is mounted in place on the cartridge mount provided in the disk drive unit 50. At this time, the optical disk 2 is loaded in place in the disk drive. Here, the disk drive is driven to read program data recorded in the optical disk 2 to play a program.

After reading the optical disk 2, the eject button 55 is pressed to eject the disk cartridge 1 from the disk drive unit 50. When the eject button 55 is operated, the disk cartridge 1 mounted on the cartridge mount is ejected. The operation of cartridge ejection will not be described in detail herein. With this ejection, the shutter member 15 is moved in relation to the cartridge body 5 to cover the head opening 13 and returned to the initial position where it is locked with covering the head opening 13. Along with this return of the shutter member 15 to this initial position, the disk cartridge 1 is ejected through the cartridge slot 53. Here, the ejection of the disk cartridge 1 from the disk drive unit 50 is complete.

According to the present invention, the disk cartridge 1 may be constructed as to the shutter member 15, and the return helical spring to force the shutter member 15 to move to any selected one of the positions to uncover and cover the head opening 13, as will be described below. It should be noted that in the following, the same elements as those in the aforementioned disk cartridge 1 will be indicated with the same reference numerals having been used in the foregoing and not be described in detail. Also, the disk cartridge 1 which will be illustrated and explained below is constructed without the shutter member locking mechanism 27 intended to lock the shutter member in a position to cover the head opening.

The modified disk cartridge 1 includes a shutter member 65 which is formed by punching and bending a thin metal sheet or molding from a synthetic resin. The shutter member 65 includes a flat shutter portion 66 formed to have a rectangular shape large enough to cover the head opening 13, and a supporting portion 67 formed at the based end of the shutter portion 66 to have a horseshoe-shaped section.

With the upper half 3 of the cartridge body 5 being supported on the supporting portion 67, the shutter member 65 is movable in the directions to uncover and cover the head opening 13. More specifically, with the supporting portion 67 being supported on the sliding guide portion 18 formed from a part of the peripheral wall 3a rising from the upper half 3, the shutter member 65 is installed movably to the cartridge body 5 as shown in FIG. 19.

Figure 20:
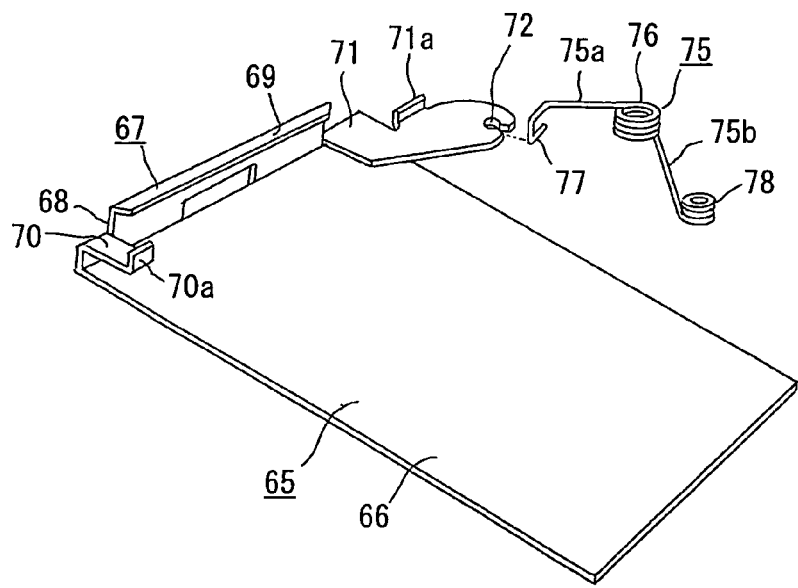
FIG. 20 is also a perspective view showing the variation of the shutter member and a return helical spring installed to the shutter member.

As shown in FIGS. 19 and 20, the supporting portion 67 of the shutter member 65 includes a coupling portion 68 formed to rise vertically from the base portion of the shutter portion 66 and a first engagement portion 69 formed along the top of the coupling portion 68 to overhang the shutter portion 66. The coupling portion 68 has also a second engagement portion 70 bent to have an L shape. The second engagement portion 70 is formed downstream of the moving direction of the shutter member 65 and at a level one step lower than the first engagement portion 69. The second engagement portion 70 has an L-shaped bent portion 70a having the free end thereof bent perpendicularly to the first engagement portion 69.

The coupling portion 68 has a helical-spring retainer 71 formed upstream of the moving direction of the shutter member 65 and having a helical-spring hooking hole 72 in which there is hooked a hooking end portion 77 of a return helical spring 75 which will be described in detail later. The helical-spring retainer 71 is formed to overhang the shutter portion 66. The helical-spring hooking hole 72 is generally circular and partially discontinuous. Similarly to the second engagement portion 70, the helical-spring retainer 71 has also an L-shaped bent portion 71a having the free end thereof bent perpendicularly to the first engagement portion 69.

The hooking end portion 77 of a first arm portion 75a of the return helical spring 75, which will be described in detail later, is introduced into the helical-spring hooking hole 72 through the discontinuity of the latter to couple the shutter member 65 and return helical spring 75 with each other.

Figure 21:
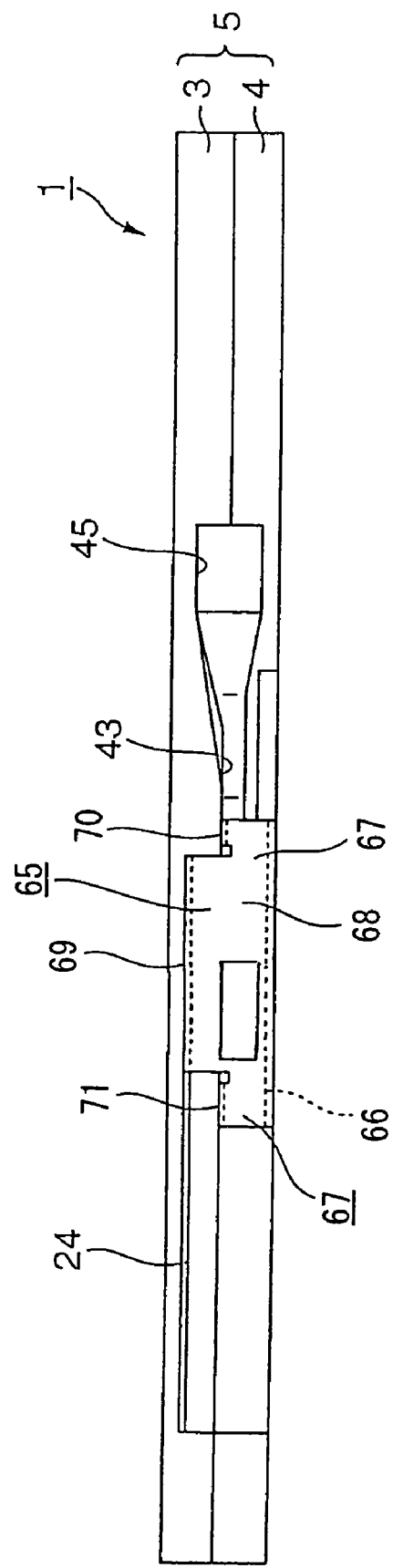
FIG. 21 is a side elevation of the disk cartridge according to the present invention, showing the side of the disk cartridge at which the shutter member is installed.
Figure 22:
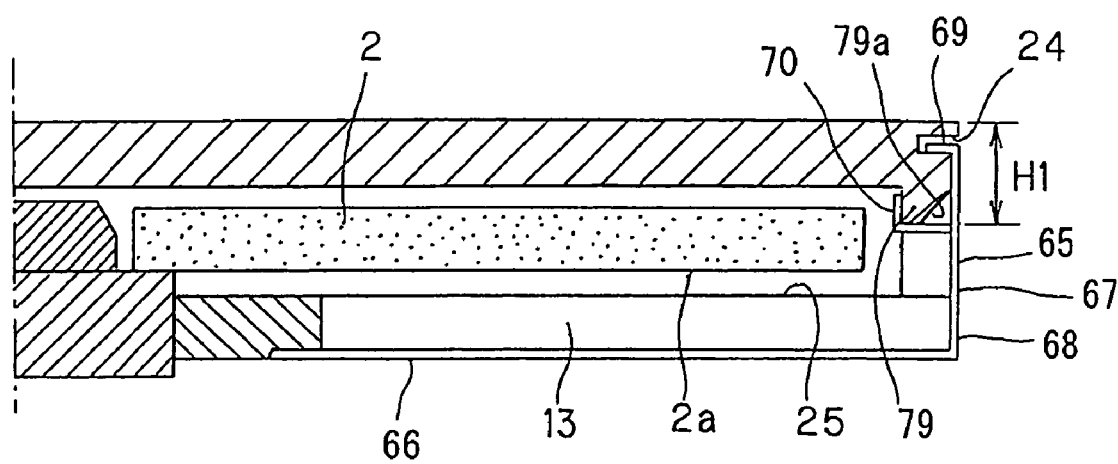
FIG. 22 is a sectional view showing the shutter member installed to the cartridge body.

The shutter member 65 is disposed in the cartridge body 5 for the shutter portion 66 to extend over the head opening 13. As shown in FIGS. 21 and 22, the first engagement portion 69 of the supporting portion 67 of the shutter member 65 is engaged in the engagement recess 24 formed in the sliding guide portion 18 while the L-shaped bent portions 70a and 71a of the second engagement portion 70 and helical-spring retainer 71, respectively, are engaged on a guide rail portion 79 of the upper half 3, thereby supporting the supporting portion 67 with the sliding guide portion 18 being caught by the first and second engagement portions 69 and 70 and the helical-spring retainer 71. The shutter member 65 thus supported is guided by the supporting portion 67 to move in the direction to uncover or cover the head opening 13.

Next, there will be illustrated and explained the return helical spring 75 which positively moves the shutter member 65 in the direction to uncover or cover the head opening 13 and positively holds the shutter member 65 in the position to uncover or cover the head opening 13. The return helical spring 75 is engaged at one end thereof on the shutter member 65 and pivotably at the other end on the cartridge body 5. The return helical spring 75 forces the shutter member 65 to turn in the direction uncover or cover the head opening 13 correspondingly to a position to which the shutter member 65 has been moved in relation to the cartridge body 5.

As shown in FIGS. 23(b) and 23(b), the return helical spring 75 includes a first arm portion 75a which is engaged on the shutter member 65, a second arm portion 75b supported on a part of the cartridge body 5 and a first coil portion 76 provided between the first and second arm portions 75a and 75b.

The first coil portion 76 is formed by winding a plurality of times to a predetermined thickness. The first arm portion 75a extends from one thickness-directional end 76a of the first coil portion 76 and the second arm portion 75b extends from the other thickness-directional end 76b. The first coil portion 76 may be designed for various diameters, numbers of turns and free angles. However, a return helical spring should be selected which has a diameter, number of turns and free angle, all of optimum values.

The first arm portion 75a extending from the first coil portion 76 has formed at the free end thereof the hooking end portion 77 which is to be engaged on the shutter member 65. The hooking end portion 77 includes a portion 77a extending from the end of the first arm portion 75a, a rising portion 77b bent generally at a right angle in relation to the extending direction of the extension portion 77a in the winding direction of the first coil portion 76, and a bent portion 77c contiguous to the rising portion 77b and bent generally in parallel to the first arm portion 75a. The hooking end portion 77 has thus a generally horseshoe-like shape. The bent portion 77c of the hooking end portion 77 is bent at a predetermined angle $\theta_1$ in relation to the extending direction of the first arm portion 75a. The hooking end portion 77 has the rising portion 77b thereof inserted, from the cut, and hooked in the helical-spring hooking hole 72 formed in the end portion of the helical-spring retainer 71 of the shutter member 65, so that the return helical spring 75 is supported by the shutter member 65.

Figure 24:
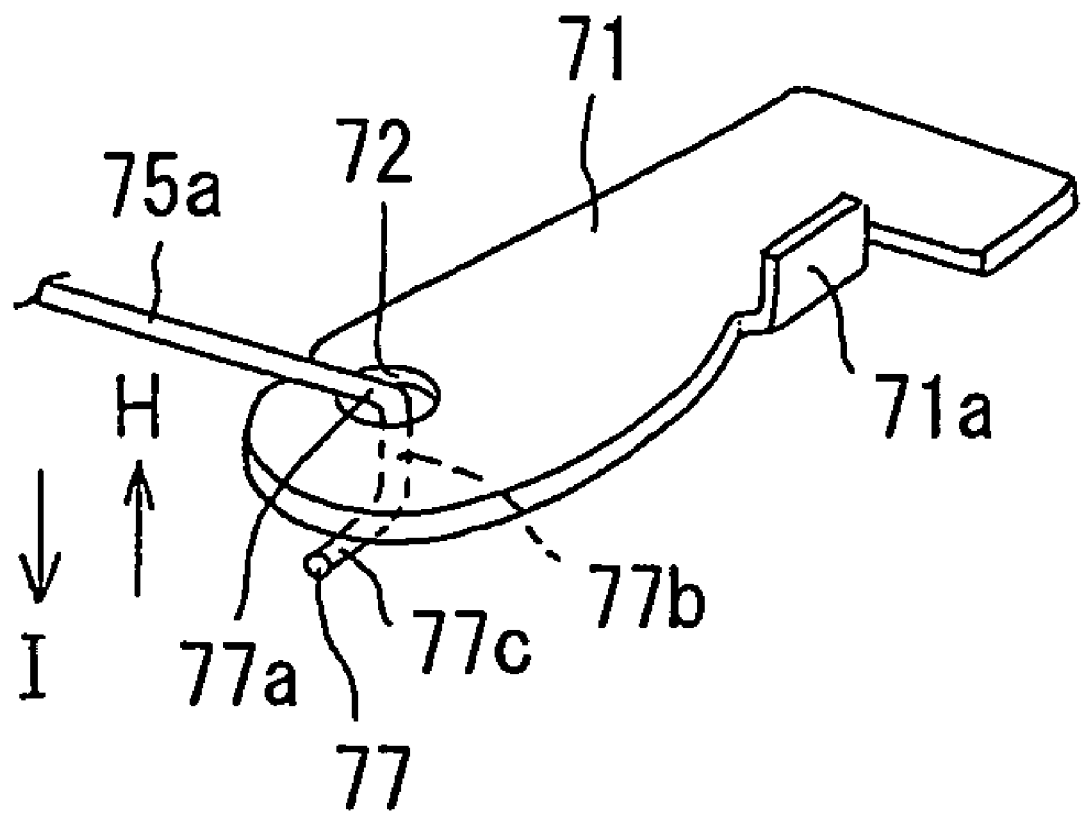
FIG. 24 is a perspective view is a perspective view of the return helical spring (in FIG. 23) engaged in the shutter member.

Since the bent portion 77c of the hooking end portion 77 is bent at the predetermined angle $\theta_1$ in relation to the extending direction of the first arm portion 75a, the hooking end portion 77 is prevented from being unhooked from the helical-spring hooking hole 72 even when the shutter member 65 is moved to uncover or cover the head opening 13. That is, since the free end of the hooking end portion 77 is bent, the bent portion 77c of the return helical spring 75 extends under the helical-spring retainer 71 as shown in FIG. 24. Therefore, even if the return helical spring 75 is swayed in the direction of H in FIG. 24 or the shutter member 65 is swayed in the direction of arrow I in FIG. 24 while the shutter member 65 is moving to uncover or cover the head opening 13, the bent portion 77c of the hooking end portion 77 abuts the bottom of the helical-spring retainer 71, so that the return helical spring 75 and shutter member 65 can be prevented from being disengaged from each other.

Also, by forming the return helical spring 75 so that the extension portion 77a and bent portion 77c are bent to have predetermined angles $\theta_2$ and $\theta_3$, respectively, in relation to the extending direction of the first arm portion 75a as shown in FIGS. 25(a) and 25(b), it is possible to prevent the hooking end portion 77 more positively from being unhooked from the helical-spring hooking hole 72. That is, by forming the return helical spring 75 so that the free end of the hooking end portion 77 is bent at a predetermined angle at two points, namely, at the extension portion 77a and bent portion 77c, the extension portion 77a extends over the helical-spring retainer 71 and the bent portion 77c extends under the helical-spring retainer 71 as shown in FIG. 26. Therefore, even if the return helical spring 75 or shutter member 65 is swayed vertically, namely, in the direction of arrow H or I in FIG. 26 while the shutter member 65 is moving to uncover or cover the head opening 13, the extension portion 77a of the hooking end portion 77 abuts the upper side of the helical-spring retainer 71 and the bend portion 77c abuts the lower side of the helical-spring retainer 71, so that the return helical spring 75 and shutter member 65 can be prevented from being disengaged from each other.

Figure 23:
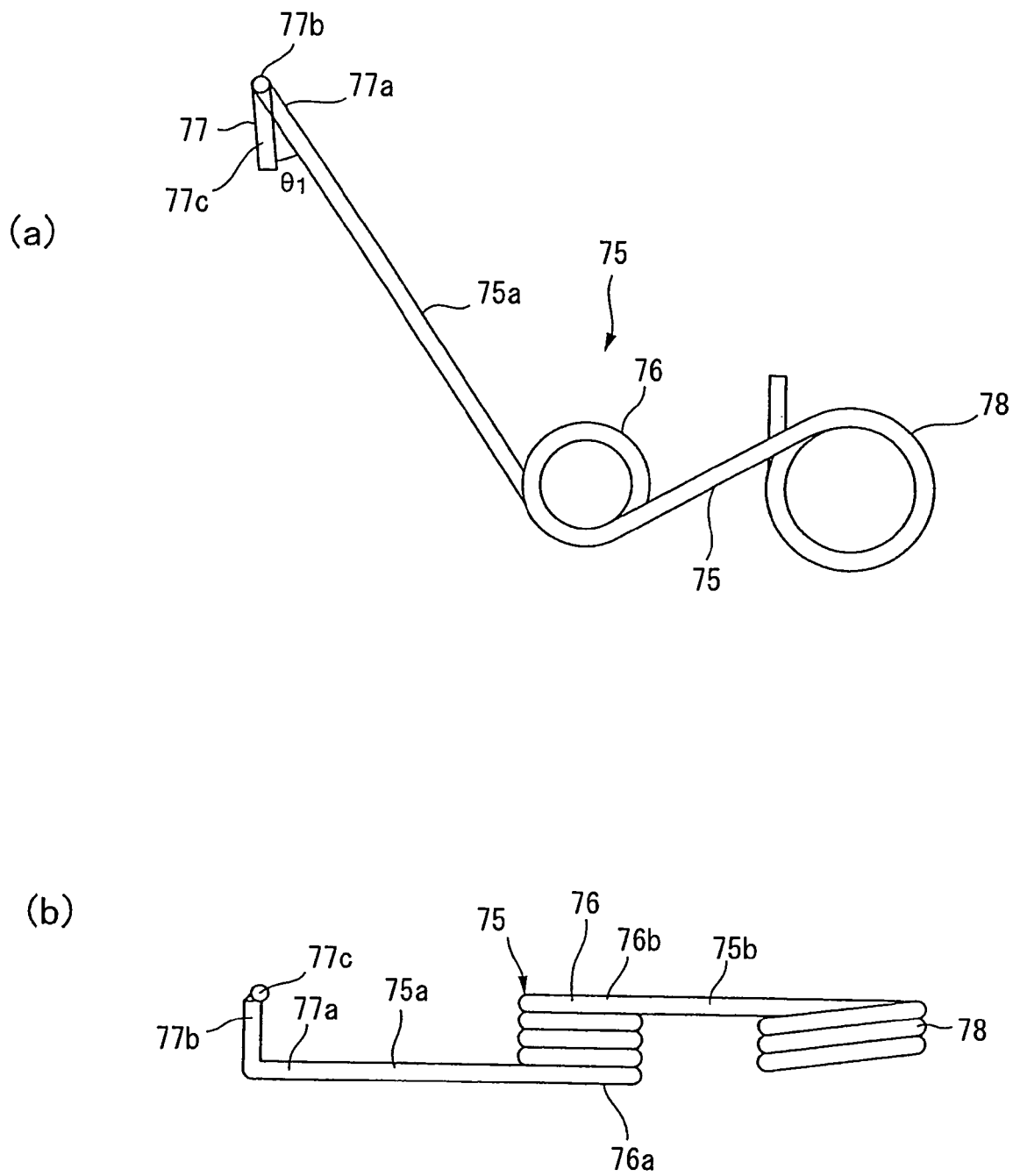
FIG. 23 shows a variant of the return helical spring used in the cartridge body.
Figure 25:
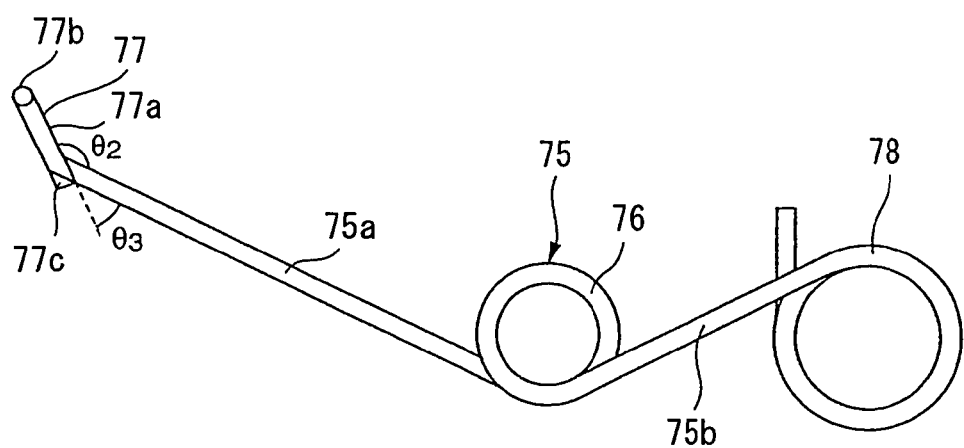
FIG. 25 shows another variant of the return helical spring forming a two-way forcing mechanism.
Figure 25:
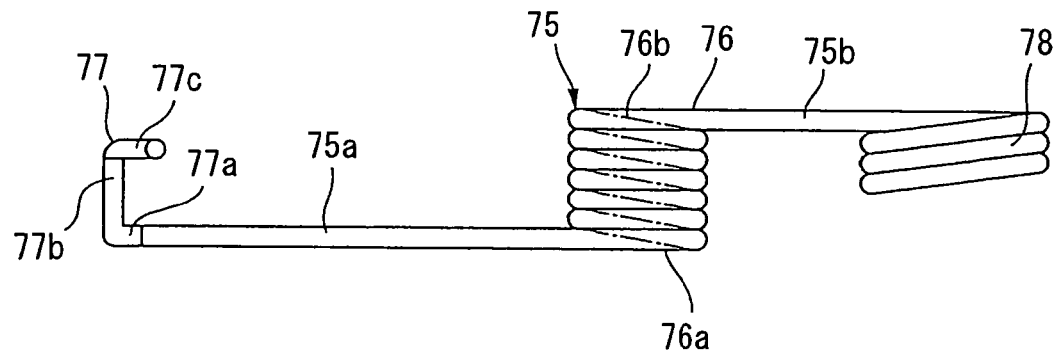
Figure 26:
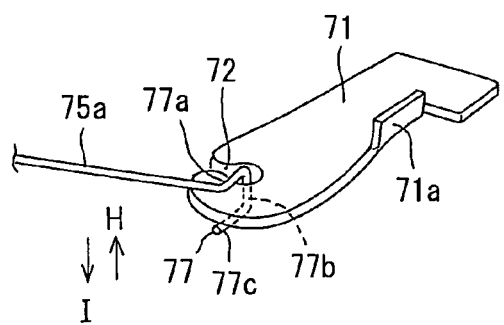
FIG. 26 is a perspective view showing the return helical spring (in FIG. 25) engaged in the shutter member.

As shown in FIGS. 23 and 25, the second arm portion 75b of the return helical spring 75 has a second coil portion 78 by which the return helical spring 75 is pivotably engaged on the cartridge body 5. The second coil portion 78 is wound a plurality of times in a direction opposite to the winding direction of the first coil portion 76 but in the direction of the thickness of the first coil portion 76 toward the one end 76a. The second coil portion 78 is pivotably installed on the supporting pin 42 projected from the inner surface of the cartridge body 5. It should be noted that the second coil portion 78 may be designed for various diameters, numbers of turns and free angles similarly to the first coil portion 76. However, a return helical spring should be selected which has a diameter, number of turns and free angle, all of optimum values.

Since the first and second coil portions 76 and 78 are wound a plurality of times in the directions opposite to each other, so the return helical spring 75 can be formed to have a reduced entire thickness which will contribute to a thinner design of the cartridge body 5. That is, if a plurality of coil portions of the return helical spring 75 is formed by winding them in the same direction, the second coil portion 78 will be wound further from the position of the other end 76b in a direction away from the first end 76a in the direction of the thickness of the first coil portion 76, which will add the thickness of the second coil portion 78 to that of the first coil portion 76, which will add to the thickness of the entire spring and thus to the thickness of the cartridge body. This coil winding will lead to an increased thickness of the disk drive unit in which such a disk cartridge is used.

In the return helical spring 75 according to the present invention, the first and second coil portions 76 and 78 are wound in the directions opposite to each other. Namely, the second coil portion 78 is wound in the direction of the one end 76a of the first coil portion 76, so that the return helical spring 75 can be formed to have the entire thickness limited to the thickness of the first or second coil portion 76 or 78.

Figure 27:
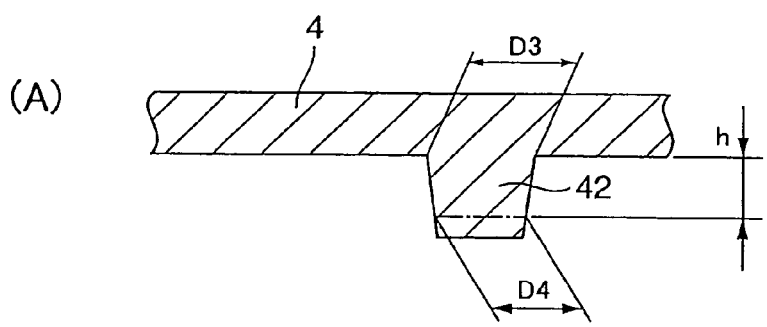
FIG. 27 shows a still another variant of the return helical spring forming the two-way forcing mechanism.
Figure 27:
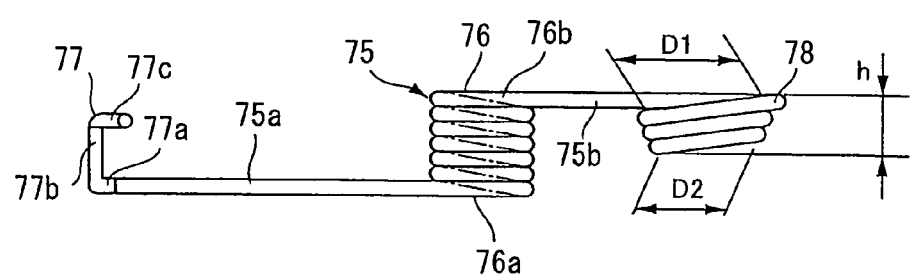

Also, according to the present invention, the second coil portion 78 of the return helical spring 75 may be formed to be smaller in diameter in the direction toward the thickness-directional end thereof while the supporting pin 42 projecting from the cartridge body 5 and on which the second coil portion 78 is engaged may be formed to be smaller in diameter in the direction toward the projecting-directional end thereof, as will be known from FIG. 27.

More specifically, the second coil portion 78 of the return helical spring 75 is wound for the diameter D1 at the winding-directional base end thereof to be larger than the diameter D2 at the winding-directional free end and gradually smaller as it goes toward the free end. Also, the supporting pin 42 provided on the cartridge body 5 and on which the second coil portion 78 is engaged is formed for the diameter D3 at the projecting-directional base end thereof to be larger than the diameter D4 at the projecting-directional free end and gradually smaller as it goes toward the free end. Further, the second coil portion 78 and supporting pin 42 are formed for the diameters D1 and D3 at the base ends thereof to be generally equal to each other and for the diameters D2 and D4 at the free ends thereof to be generally equal to each other. It should be noted that the supporting pin 42 is formed to have a height larger than the thickness h of the second coil portion 78 and have, at a height h from the base end, a diameter D4 which is generally the same as the diameter D2 at the free end of the second coil portion 78.

In the above disk cartridge 1, the second coil portion 78 can be engaged closely on the supporting pin 42 in a range from the winding-directional base end to free end of the second coil portion 78 to prevent the second coil portion 78 as a turning fulcrum from rattling when the return helical spring 75 is turned as the shutter member 65 uncovers or covers the head opening 13. Also, since the return helical spring 75 is thus prevented from rattling on the cartridge body 5, it can be prevented from being disengaged from the cartridge body 5 and shutter member 65 while the disk cartridge 1 is being used.

Figure 28:
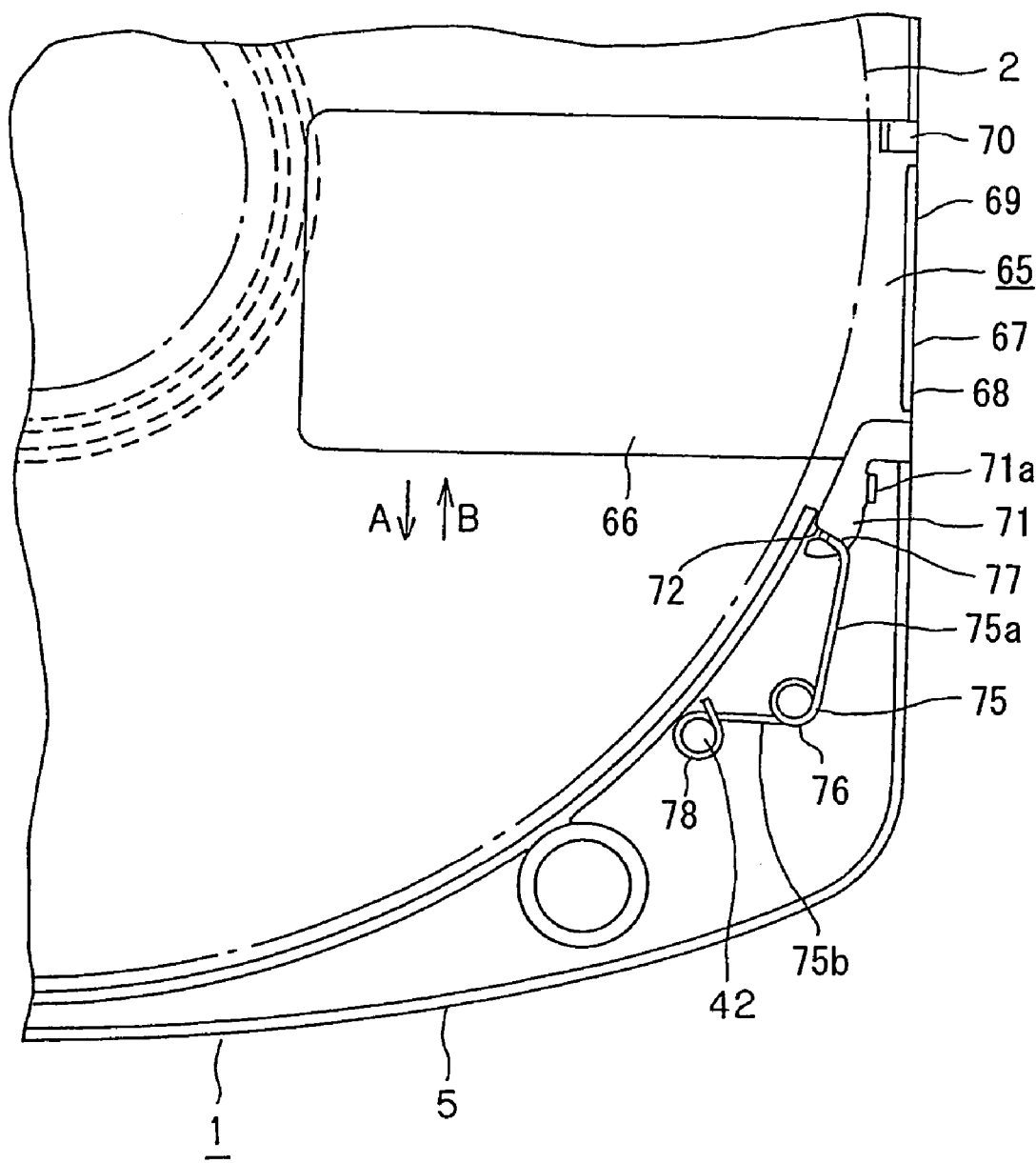
FIG. 28 is a plan view of the disk cartridge, showing the shutter member covering the head opening.
Figure 29:
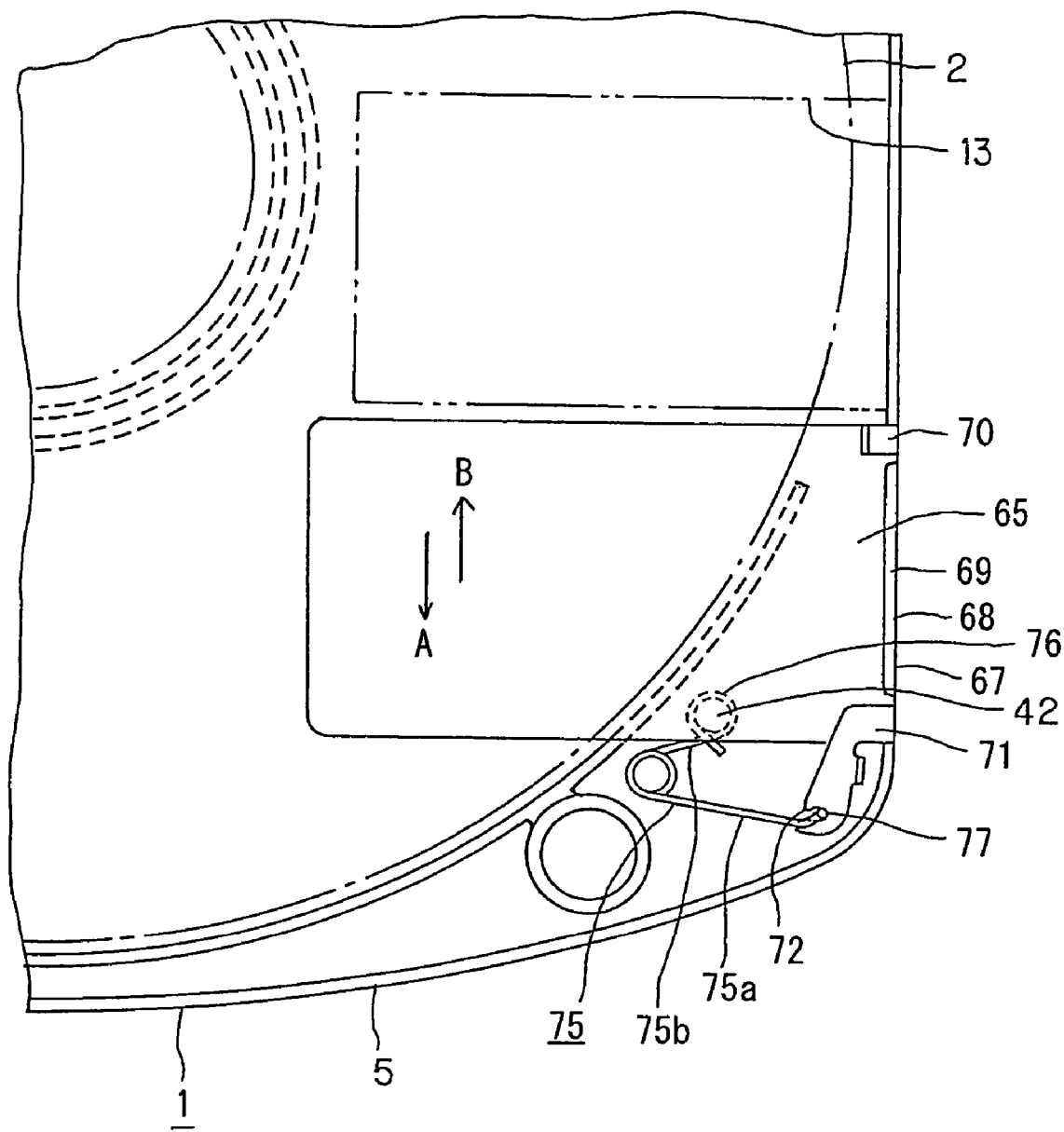
FIG. 29 is also a plan view of the disk cartridge, showing the shutter member moved to a position to uncover the head opening.

When the return helical spring 75 is in the position for the shutter member 65 to cover the head opening 13, the return helical spring 75 is forcing the shutter member 65 in the direction of arrow B in FIG. 28 to keep covering the head opening 13. When the disk cartridge 1 is inserted into the disk drive unit and then loaded into the cartridge holder, the shutter releasing piece provided at the disk drive unit enters the guide recess 43 formed in the lateral side 8 of the cartridge body 5 and abuts the coupling portion 68 of the shutter member 65 from downstream of the moving direction of the shutter member 65, so that the shutter member 65 will be limited from moving in the direction of insertion and moved in relation to the cartridge body 5 the direction of arrow A in FIG. 28 in which it will uncover the head opening 13. Thus, the first coil portion 76 formed in a non-fixed center of the return helical spring 75 is moved about the supporting pin 42 on which the second coil portion 78 is pivotably engaged in the direction of arrow A in which the shutter member 65 is moved. When the first coil portion 76 is further moved in the direction of arrow A and finally goes over the position of the supporting pin 42 located along the moving direction of the shutter member 65, the return helical spring 75 will start forcing in an opposite direction. When the forcing direction is reversed, the return helical spring 75 will force the shutter member 65 to move in the direction of arrow A in FIG. 29 to uncover the head opening 13 and hold the shutter member 65 in the position to uncover the head opening 13.

When an eject operation is made at the disk drive unit to eject the disk cartridge 1 in which the shutter member 65 is held in the position to uncover the head opening 13, the shutter member 65 will be moved in relation to the cartridge body 5 in the direction of arrow B in FIG. 28 and the central first coil portion 76 is also moved in the same direction of arrow B. This movement is opposite to the movement made when the disk cartridge 1 is inserted into the disk drive unit. When the shutter member 65 is further moved in the direction of arrow B and the first coil portion 76 finally goes over the position of the supporting pin 42 located in the position toward which the shutter member 65 will be moved, the return helical spring 75 will start forcing in an opposite direction. When the forcing direction is reversed, the return helical spring 75 will force the shutter member 65 in the direction of arrow B in FIG. 28, thus move the shutter member 15 in the direction to cover the head opening 13 and hold the shutter member 65 in the position to cover the head opening 13.

Being thus forced by the return helical spring 75, the shutter member 65 is held in each of positions to cover and uncover the head opening 13. Namely, the head opening 13 can positively be kept covered or uncovered.

Since the hooking end portion 77 formed at the end of the first arm portion 75a of the return helical spring 75 has the free end thereof bent for the bent portion 77c to extend under the helical-spring retainer 71, the bent portion 77c of the hooking end portion 77 will abut the bottom of the helical-spring retainer 71 when the return helical spring 75 is swayed in the direction of arrow H in FIG. 24 or the shutter member 65 is swayed in the direction of arrow I in FIG. 24 while the shutter member 65 is being moved to uncover or cover the head opening 13. Therefore, the return helical spring 75 and shutter member 65 can be prevented from being disengaged from each other due to such swaying.

Also, by forming the hooking end portion 77 of the return helical spring 75 so that it is bent at two points, that is, at the extension portion 77a and bent portion 77c, to form predetermined angles, respectively, the extension portion 77a extends over the helical-spring retainer 71 while the bent portion 77c extends under the helical-spring retainer 71, as shown in FIG. 26. Therefore, even if the return helical spring 75 or shutter member 65 is swayed vertically, namely, in the direction of arrow H or I in FIG. 26, while the shutter member 65 is uncovering or covering the head opening 13, the extension portion 77a of the hooking end portion 77 abuts the upper side of the helical coil retainer 71 and the bend portion 77c abuts the lower side of the helical-spring retainer 71. Thus, the return helical spring 75 and shutter member 65 are prevented from being disengaged from each other.

For forming the disk cartridge 1 having the aforementioned shutter member 65 and return helical spring 75, the upper and lower halves 3 and 4 are formed from polycarbonate by injection molding, an optical disk 2 and return helical spring 75 are placed in their respective predetermined positions, making butt-joining of the upper and lower halves 3 and 4 are butt-joined to each by to build the cartridge body 5, and then the shutter member 65 is installed into the cartridge body 5.

Figure 30:
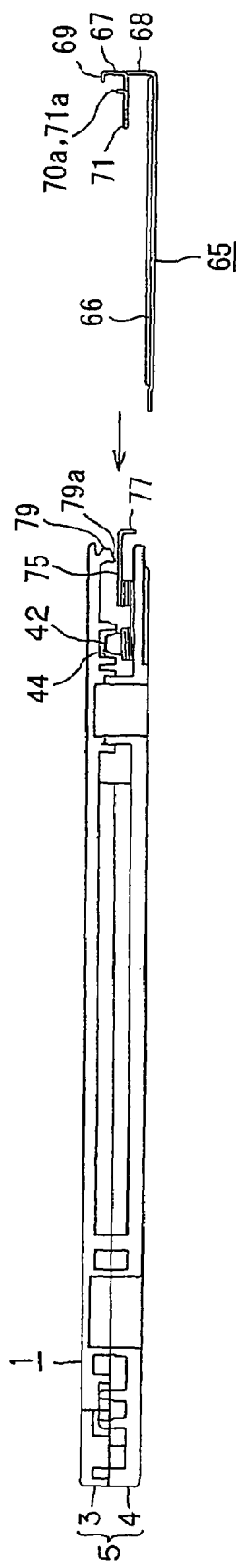
FIG. 30 shows the shutter member being installed to the cartridge body.

More specifically, after the lower half 4 is fixed to a jig, the second coil portion 78 of the return helical spring 75 is pivotably fitted onto the supporting pin 42 provided upright on the lower half 4. Then, the upper half 3 is positioned to abut the lower half 4, and the upper and lower halves 3 and 4 are joined to each other by ultrasonic welding. Thus, the cartridge body 5 is formed, the supporting pin 42 is supported on a bearing 44 formed on the upper half 3, and the return helical spring 75 is pivotably housed in the cartridge body 5. Since the second coil portion 78 of the return helical spring 75 is thus supported pivotably on the supporting pin 42, the hooking end portion 77 can be projected out of the lateral side 8 of the cartridge body 5 on which the sliding guide portion 18 is formed as shown in FIG. 30.

Figure 31:
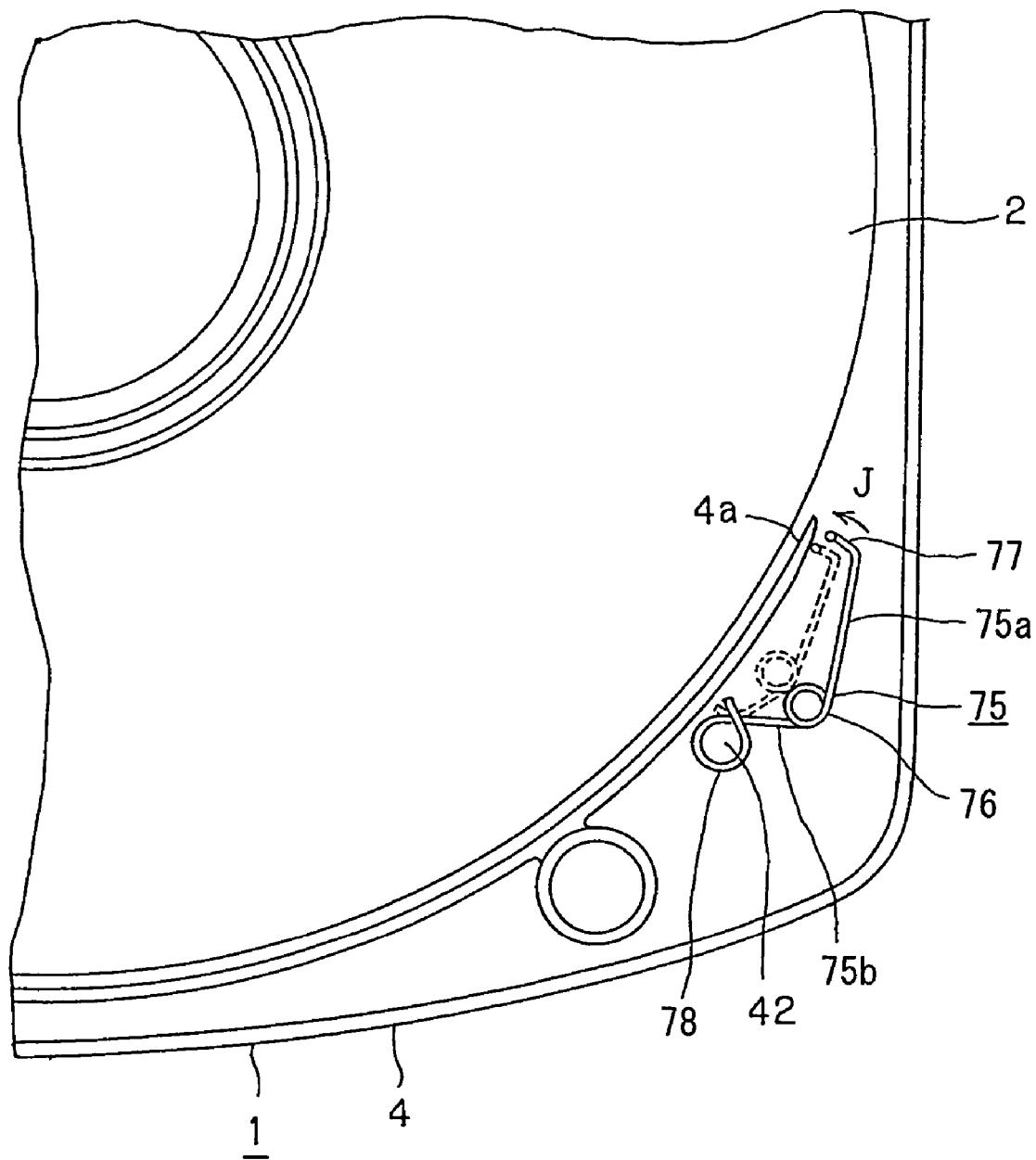
FIG. 31 is a plan view showing the return helical spring being limited from turning toward an optical disk in the disk cartridge.

Note here that since in the aforementioned cartridge body 5, the rising peripheral wall 4a of the lower half 4 is formed to extend on the turning trajectory of the return helical spring 75, when the return helical spring 75 is turned in the direction of arrow J in FIG. 31, the hooking end portion 77 abuts the rising peripheral wall 4a to limit the return helical spring 75 from turning. Therefore, it is possible to prevent the hooking end portion 77 of the return helical spring 75 in the disk cartridge according to the present invention from touching and thus scratching the optical disk 2.

The shutter member 65 is formed by punching and bending a thin metal sheet or molding from a synthetic resin. The shutter member 65 is installed to the sliding guide portion 18 formed on the lateral side of the cartridge body 5 after the hooking end portion 77 of the return helical spring 75, projecting out of the lateral side 8 of the cartridge body 5, is installed to the helical-spring retainer 71.

More particularly, the shutter portion 66 of the shutter member 65 is installed to extend on the shutter sliding concavity 19 formed in the lower half 4 with the second engagement portion 70 and helical-spring retainer 71, both formed integrally with the coupling portion 68, being placed along a taper surface 79a of the guide rail 79 formed on the upper half 3. Also, the rising portion 77b provided on the hooking end portion 77 of the return helical spring 75 is inserted, from the discontinuity of the helical-spring hooking hole 72, into the hooking hole 72 formed in the helical-spring retainer 71 extending from the coupling portion 68, thereby coupling the shutter member 65 and return helical spring 75 with each other. Next, the shutter member 65 is slidably installed on the cartridge body 5 with the first engagement portion 69 extending from the coupling portion 68 being elastically engaged in the engagement recess 24 in the upper half 3 as well as with the L-shaped bent portions 70a and 71a formed integrally with the second engagement portion 70 and helical-spring retainer 71, respectively, being placed inside the guide rail 79, as shown in FIG. 22. Here, the disk cartridge 1 is completely assembled.

As above, the return helical spring 75 and shutter member 65 are coupled with each other by inserting the rising portion 77b formed on the hooking end portion 77 of the return helical spring 75 into the hooking hole 72 formed partially discontinuous in the helical-spring retainer 71. Namely, the shutter member 65 can easily be assembled to the cartridge body 5. Also, after the shutter member 65 is coupled with the return helical spring 75, the extension portion 77a or bent portion 77c formed on the hooking end portion 77 of the return helical spring 75 abuts the helical-spring retainer 71 to prevent the return helical spring 75 from being easily disengaged from the shutter member 65.

According to the present invention, the disk cartridge 1 may also be constructed as will be described below. It should be noted that in the following, the same elements as those in the aforementioned disk cartridge 1 will be indicated with the same reference numerals having been used in the foregoing and not be described in detail.

Figure 32:
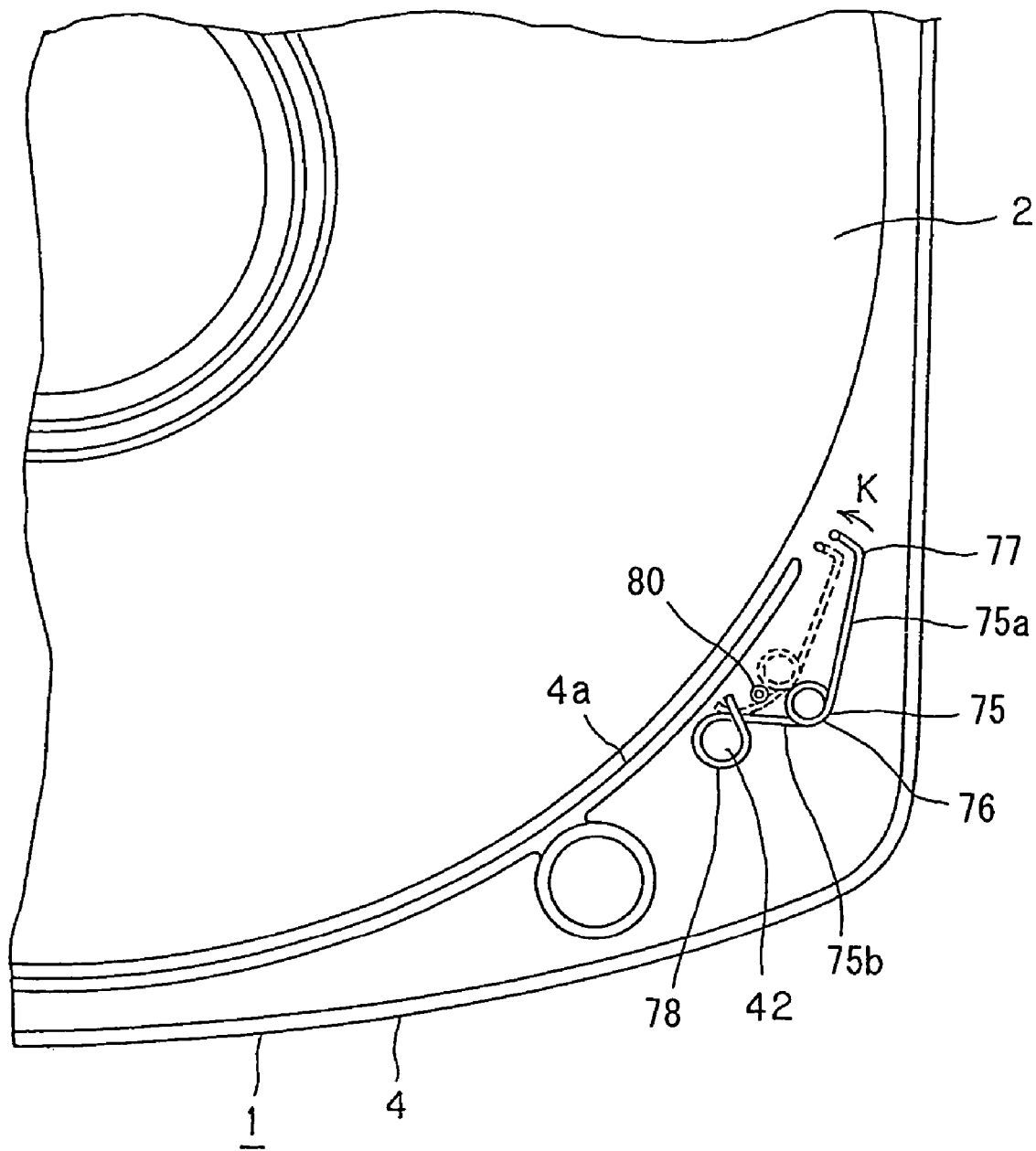
FIG. 32 is also a plan view showing the return helical spring being limited from turning toward the optical disk.

The lower half 4 of the cartridge body 5 has formed on the turning trajectory of the return helical spring 75 a turn limiting projection 80 to limit the return helical spring 75 from turning, as shown in FIG. 32. The turn limiting projection 80 is formed near the rising peripheral wall 4*a* of the lower half 4 to limit the hooking end portion 77 of the return helical spring 75 from turning in the direction of arrow K in FIG. 32 toward the optical disk 2. Therefore, also in this disk cartridge 1, it is possible to prevent the hooking end portion 77 of the return helical spring 75 provided in the cartridge body 5 from touching and hence scratching the optical disk 2.

Note that since the turn limiting projection 80 is formed near the rising peripheral wall 4*a* of the lower half 4, it will not interfere at all with the return helical spring 75 being moved inside the cartridge body 5 to force the shutter member 65 to uncover or cover the head opening 13.

The aforementioned disk cartridge 1 uses the return helical spring 39 or 75 to form the two-way forcing mechanism 38 which forces the shutter member 15 or 65 toward any selected one of the positions to uncover and cover the head opening 13. According to the present invention, however, the disk cartridge 1 is not limited to these embodiments but may be constructed as will be illustrated and explained below.

Another embodiment of the disk cartridge 1 according to the present invention will be described below with reference to the accompanying drawings.

Note that the disk cartridge 1 is constructed without the shutter member locking mechanism 27 intended for locking the shutter member 15 in the position to cover the head opening 13.

Figure 33:
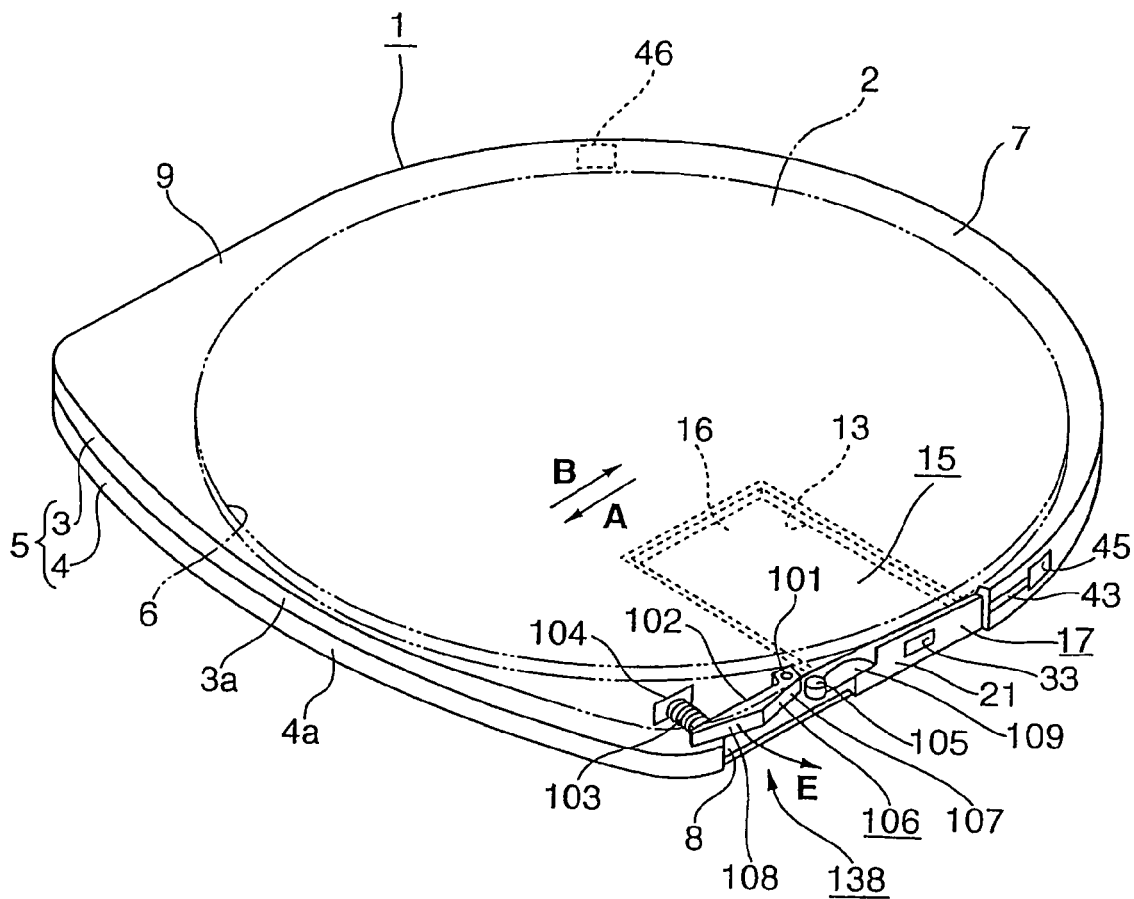
FIG. 33 is a perspective view of another embodiment of the disk cartridge according to the present invention.

The disk cartridge 1 according this embodiment is constructed using a two-way forcing mechanism 138 which forces the shutter member 15 toward any selected one of positions to uncover and cover the head opening 13, as shown in FIG. 33. This two-way forcing mechanism 138 is also provided upstream of the direction of arrow A in which the shutter member 15 is moved from the position to cover the head opening 13 toward the position to uncover the head opening 13.

As shown in FIG. 33, the two-way forcing mechanism 138 includes a pivoting lever 102 supported on the inner surface of the lower half 4 of the cartridge body 5 to be pivotable about a pivot shaft 101, and a helical compression spring 103 which forces the pivoting lever 102 to turn.

The pivoting lever 102 extends along the moving direction of the shutter member 15. It is disposed with the base end thereof supported on the pivot shaft 101 being positioned downstream of the moving direction of the shutter member 15 and the free end being positioned upstream of the moving direction of the shutter member 15. The pivoting lever 102 is forced by the helical compression spring 103 interposed between a spring support 104 provided inside the cartridge body 5 and the free end of the pivoting lever 102 to turn about the pivot shaft 101 in the direction of arrow E in FIG. 33. That is, the pivoting lever 102 has the free end thereof forced to turn toward one (8) of the lateral sides of the cartridge body 5, along which the shutter member 15 slides.

Note that the free end of the pivoting lever 102 abuts the rising peripheral walls 3*a* and 4*a* of the cartridge body 5 to limit the pivoting lever 102 from being pivoted.

On one side of the pivoting lever 102, namely, on the side opposite to the supporting portion 17 of the shutter member 15, supported on the cartridge body 5, there is provided a to-be-pushed surface 106 which is pushed by a pushing portion 105 provided on the shutter member 15. The to-be-pushed surface 106 has an apex 106*a* at the longitudinal center of the pivoting lever 102, and includes a first slope 107 slanted from the apex 106*a* toward the base end of the to-be-pushed surface 106 and a second slope 108 slanted from the apex 106*a* toward the free end.

Note that the pushing portion 105 provided on the shutter member 15 includes an extension portion 109 formed by cutting and erecting a part of the coupling portion 21 to project upstream of the moving direction of the shutter member 15 and implanting a cylindrical pin in the free end of the extension portion 109. Also, the pushing portion 105 is disposed on the shutter member 15 to abut the to-be-pushed surface 106 of the pivoting lever 102 installed on the cartridge body 5 when the shutter member 15 is supported on the cartridge body 5.

The first slope 107 of the to-be-pushed surface 106 guides the pushing portion 105 riding on this first slope 107 in moving toward the base end of the pivoting lever 102 and in the direction for the shutter member 15 to cover the head opening 13. Also, the second slope 108 guides the pushing portion 105 riding on this second slope 108 in moving toward the free end of the pivoting lever 102 and in the direction for the shutter member 15 to uncover the head opening 13.

In the two-way forcing mechanism 138 shown in FIG. 33, the helical compression spring 103 forces the pivoting lever 102 in the direction of arrow E to abut the pushing portion 105 of the shutter member 15. Thus, the shutter member 15 is guided to move in the direction of arrow B in FIG. 33 to cover the head opening 13 or in the direction of arrow A in FIG. 33 to uncover the head opening 13 depending upon whether the pushing portion 105 is positioned on the first slope 107 or second slope 108. At this time, since the pivoting lever 102 has been forced by the helical compression spring 103 to turn in the direction of arrow E in FIG. 33 to push the pushing portion 105 of the shutter member 15, it is parallel to the moving direction of the shutter member 15. As a result, the pushing portion 105 on the first or second slope 107 or 108 is pushed by the slope 107 or 108 to move in the direction of arrow B in FIG. 33 to cover the head opening 13 or in the direction of arrow A in FIG. 33 to uncover the head opening 13. As the pushing portion 105 is moved under the guidance of the first or second slope 107 or 108, the shutter member 15 is moved to a position to cover or uncover the head opening 13. When the shutter member 15 has been moved to the position to cover the head opening 13 as shown in FIG. 33, the pushing portion 105 is pushed and supported on the first slope 107 of the pivoting lever 102 forced to turn. Thus, the pushing portion 105 is always forced in the direction of arrow B in FIG. 33 to keep covering the head opening 13 with the shutter member 15.

Therefore, the head opening 13 can positively be covered also in the disk cartridge 1 according to this embodiment.

Also, when the shutter member 15 has been moved to the position to uncover the head opening 13, the pushing portion 105 is pushed and supported on the second slope 108 of the pivoting lever 102. Thus, the pushing portion 105 is always forced in the direction of arrow A in FIG. 33 to keep uncovering the head opening 13. Therefore, also the disc drive unit compatible with this disk cartridge 1 needs not any mechanism which keeps the shutter member 15 in a position to uncover the head opening 13. The disk drive unit itself can thus be designed more simple and compact.

Now, there will be described uncovering and covering the head opening 13 when the disk cartridge 1 according to this embodiment is inserted in and ejected from the disk drive unit 50.

Initially, that is, when the disk cartridge 1 according to this embodiment is not yet inserted in the disk drive unit 50, the shutter member 15 is always forced in the direction of arrow B in FIG. 33 and held in the position to cover the head opening 13 with the pushing portion 105 being pushed and supported on the first slope 107 of the pivoting lever 102 forced to turn.

Figure 34:
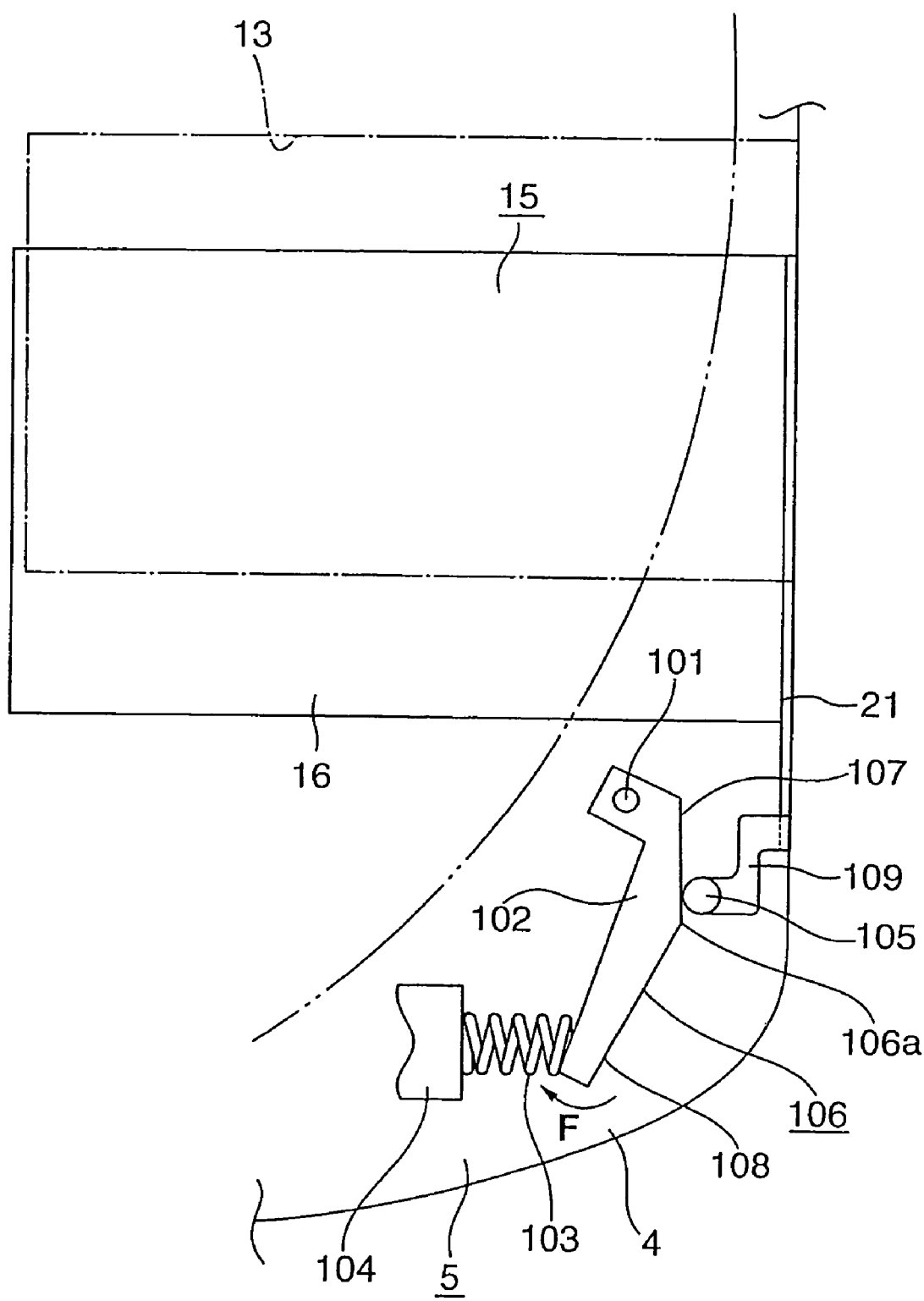
FIG. 34 is a plan view of the disk cartridge shown in FIG. 33, showing the shutter member having been moved halfway in the direction to uncover the head opening.
Figure 35:
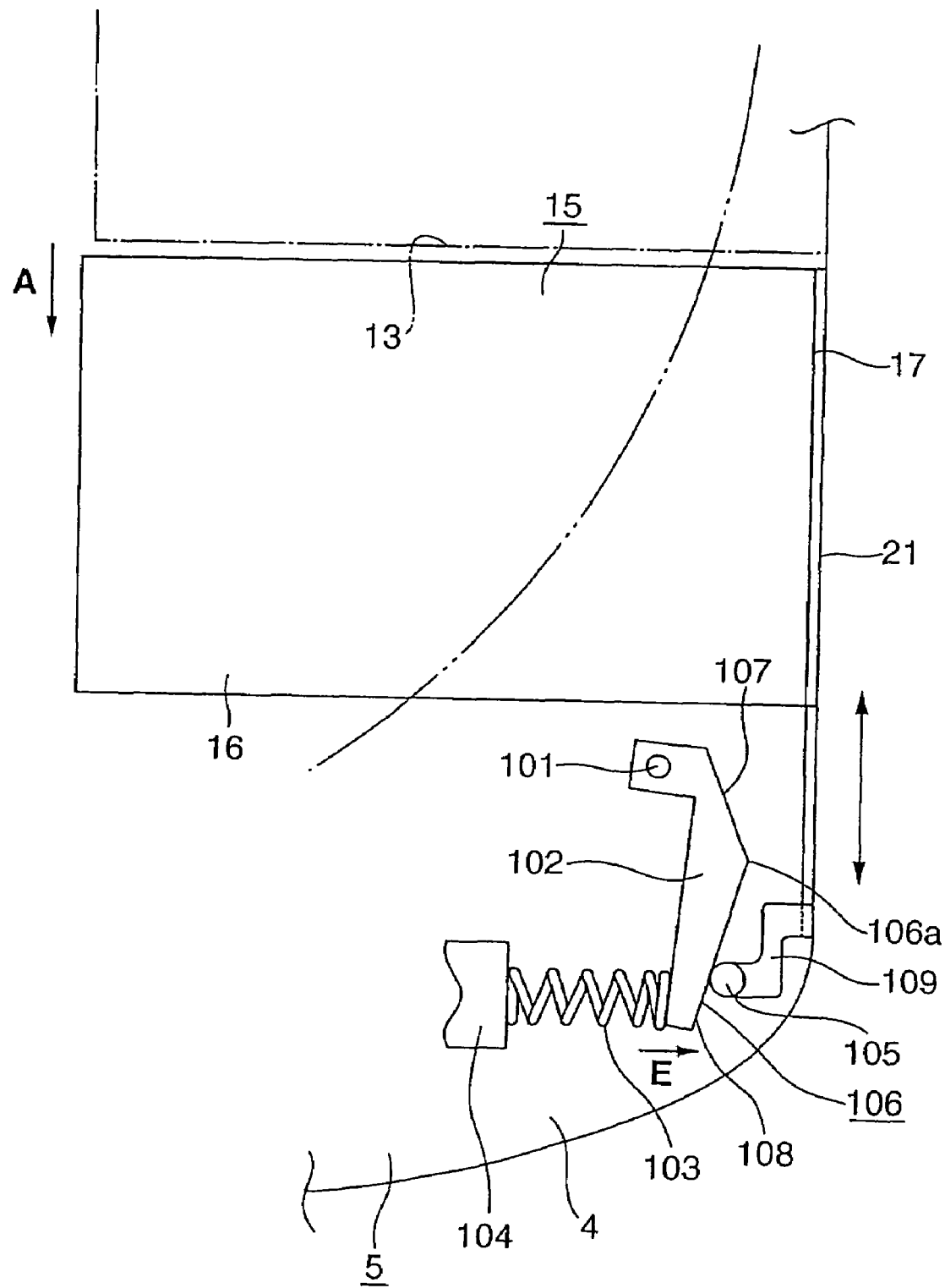
FIG. 35 is also a plan view of the disk cartridge in FIG. 33, showing the shutter member having been moved to a position to uncover the head opening to the full extent.

As the disk cartridge 1 is inserted first at the circular front end 7 thereof into the cartridge holder 54 of the disk drive unit 50, the shutter member 15 is moved by the shutter releasing piece 63 provided on the cartridge holder 54 in the direction of arrow A in FIG. 33. When the shutter member 15 is moved in the direction of arrow A in FIG. 33, the pushing portion 105 will turn the pivoting lever 102 against the force of the helical compression spring 103 in the direction of arrow F in FIG. 34 while moving on the first slope 107. When the disk cartridge 1 is inserted deeper into the cartridge holder 54 and the pushing portion 105 goes over the apex 106a of the to-be-pushed surface 106 and arrives at the second slope 108, the pivoting lever 102 will be forced by the helical compression spring 103 to return in the direction of arrow E in FIG. 35. That is, the pivoting lever 102 turns to restore the second slope 108 slanted oppositely to the first slope 107 to its initial state. As a result, the pushing portion 105 on the second slope 108 is guided by the second slope 108 in the direction of arrow A in FIG. 35 and the shutter member 15 is moved to the position to uncover the head opening 13. At this time, the pushing portion 105 is pushed and supported on the second slope 108 of the pivoting lever 102 forced to turn, and hence the shutter member 15 is always forced in the direction of arrow A in FIG. 35 to keep uncovering the head opening 13.

Also, when an operation is made at the disk drive unit 50 to eject the disk cartridge 1 from the disk drive unit 50, the pushing portion 105 is moved from on the second slope 108 of the pivoting lever 102 onto the first slope 107. When the pushing portion 105 moves over the apex 106a of the to-be-pushed surface 106 and arrives at the first slope 107, the pivoting lever 102 is forced by the helical compression spring 103 to return in the direction of arrow E in FIG. 35 to move the pushing portion 105 on the first slope 107 in the direction of arrow B in FIG. 33 and thus move the shutter member 15 to the position to cover the head opening 13. Thus, when the disk cartridge 1 is ejected from the disk drive unit 50, the shutter member 15 is returned to its initial position. Then, the pushing portion 105 will be pushed and supported on the first slope 107 of the pivoting lever 102 forced to turn when the shutter member 15 has returned to its initial position. Thus, the shutter member 15 is kept always forced in the direction of arrow B in FIG. 33 to keep covering the head opening 13.

Also in this disk cartridge 1, the shutter member 15 can positively be held in the position to uncover or cover the head opening 13, and the shutter member 15 can be forced to move to the position to uncover or cover the head opening 13 correspondingly to the position thereof relative to the head opening 13. Also, also the disk drive unit 50 compatible with the disk cartridge 1 according to this embodiment needs not an mechanism which holds the shutter member 15 in the position to uncover the head opening 13.

Figure 36:
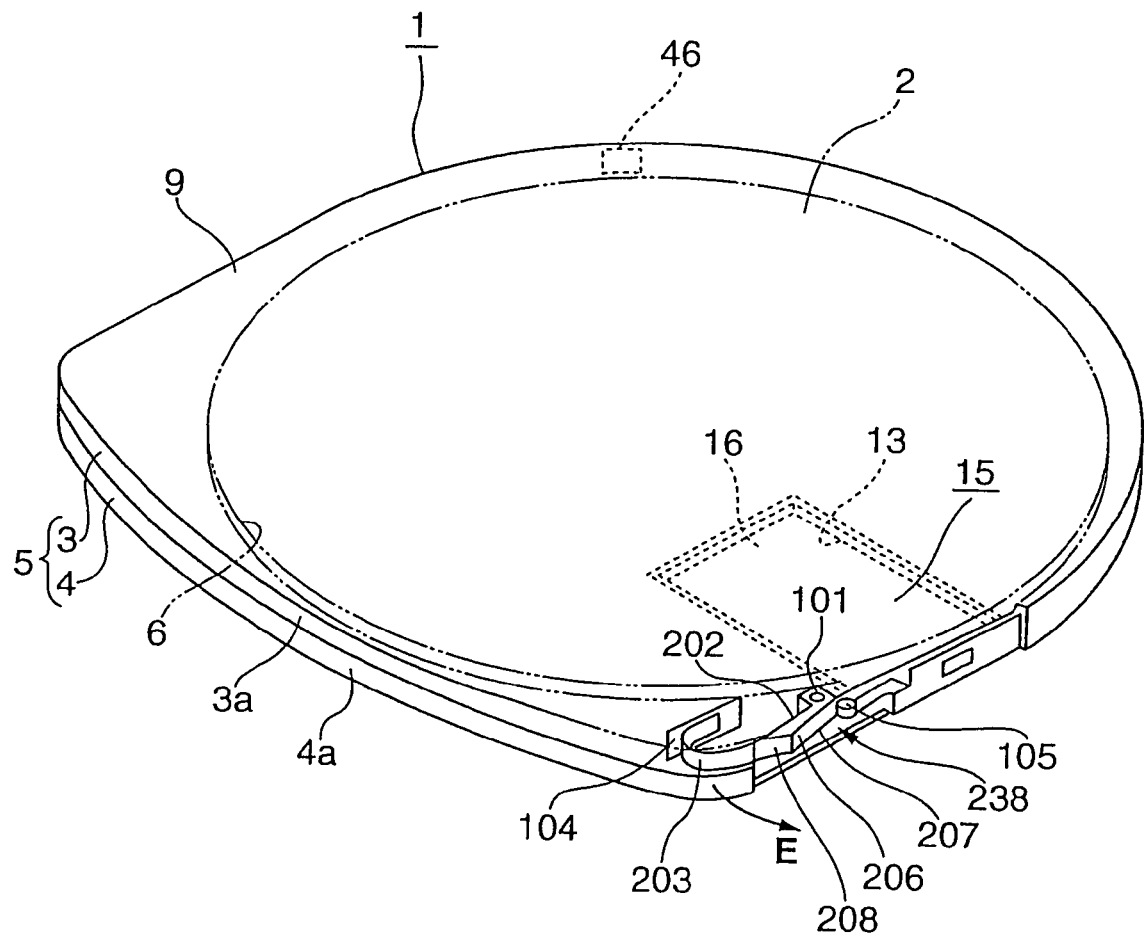
FIG. 36 is a perspective view of a still another embodiment of the disk cartridge according to the present invention.

In the aforementioned disk cartridge 1, the two-way forcing mechanism 138 includes the pivoting lever 102 and helical compression spring 103 which forces the pivoting lever 102. However, the two-way forcing mechanism may be formed from an integration of these pivoting lever 102 and helical compression spring 103. More specifically, this two-way forcing mechanism, indicated with a reference numeral 238, is an integration of a pivoting lever portion 202 and a forcing portion 203 to force the pivoting lever portion 202 to the shutter member 15, both formed from a leaf spring, as shown in FIG. 36. The pivoting lever portion 202 is formed by bending a single long leaf spring into angular shape which provides a pushing surface 206 including a first slope 207 and second slope 208 to push the pushing portion 105 of the shutter member 15. The forcing portion 203 is formed from a circularly bent free-end portion extending from a part of the leaf spring, which forms the pivoting lever portion 202.

The pivoting lever portion 202 having the forcing portion 203 formed integrally therewith is disposed inside the cartridge body 5 for the pushing surface 206 to extend along the moving direction of the shutter member 15. It is pivoted at the base end portion thereof on the pivot shaft 101 provided on the cartridge body 5 and supported at the free end thereof on the spring support 104 provided at the cartridge body 5. The pivoting lever 202 thus formed is also forced by the forcing portion 203 to pivot abut the pivot shaft 101 to press the pushing surface 206 in the direction of arrow E in FIG. 36 to the pushing portion 105 of the shutter member 15.

Also, as the disk cartridge 1 including the two-way forcing mechanism 238 constructed as shown in FIG. 36 is inserted into or ejected out of the disk drive unit 50, the shutter member 15 is moved to uncover or cover the head opening 13 and held in the position in which it uncovers or covers the head opening 13, which is however described in detail herein, as in the disk cartridge 1 using the aforementioned two-way forcing mechanism 138.

Also, in the aforementioned disk cartridge 1, the shutter member 15 is moved in any of the positions to uncover and cover the head opening 13 correspondingly to the position of the shutter member 15 relative to the head opening 13. However, the disk cartridge 1 may use a two-way forcing mechanism 338 which holds the shutter member 15 in each of the positions to uncover and cover the head opening 13, as will be described below.

Figure 37:
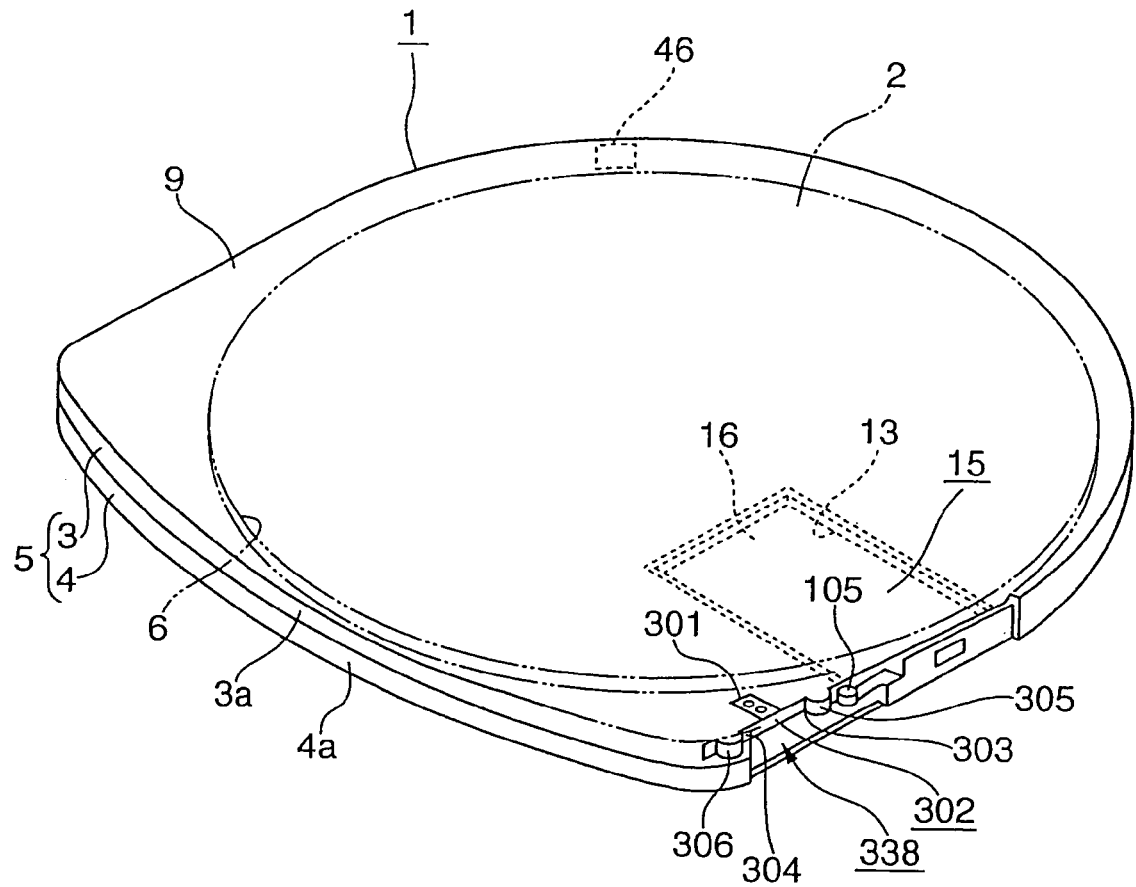
FIG. 37 is a perspective view of a yet another embodiment of the disk cartridge according to the present invention.

As shown in FIG. 37, the two-way forcing mechanism 338 includes a pushing plate 303 formed from a leaf spring. The pushing plate 302 has the longitudinal center thereof supported by a fixture 301 fixed to the cartridge body 5 to extend along the moving direction of the shutter member 15. The pushing plate 302 includes first and second pushing portions 303 and 304 projecting at opposite sides of the fixture 301. These first and second pushing portions 303 and 304 are elastically displaceable in a direction perpendicular to the moving direction of the shutter member 15 in relation to the longitudinal center, supported by the fixture 301, of the pushing plate 302.

Note that also this two-way forcing mechanism 338 is disposed upstream of the moving direction of the shutter member 15 in which the latter moves to uncover the head opening 13.

The pushing plate 302 is formed to have a length corresponding to a range in which the shutter member 15 moves between the position to cover the head opening 13 and the position to uncover the head opening 13, and it is fixed to the fixture 301 to push the pushing portion 105 of the shutter member 15, which slides on the pushing plate 302.

Also, on the free ends of the first and second pushing portions 303 and 304 of the pushing plate 302, there are provided first and second engagement projections 305 and 306, respectively, which will engage on the pushing portion 105 when the shutter member 15 has moved to the position to uncover or cover the head opening 13 and limit the shutter member 15 from being further moved.

Figure 38:
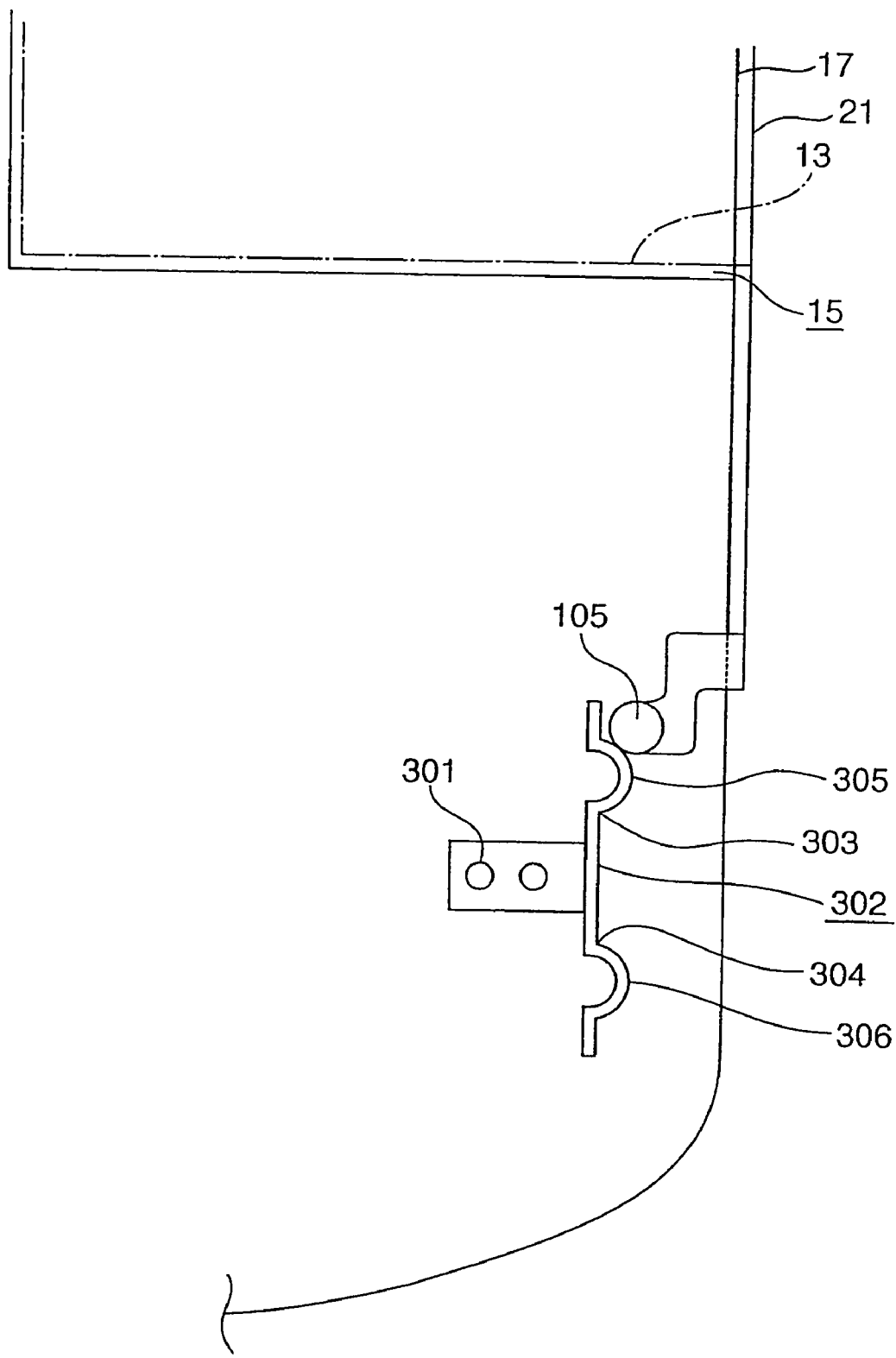
FIG. 38 is a plan view of the disk cartridge shown in FIG. 37, showing the shutter member having been moved halfway in the direction to uncover the head opening.

Also, in the disk cartridge 1 including the two-way forcing mechanism 338 constructed as above, when the shutter member 15 is moved to the position to cover the head opening 13, the pushing portion 105 moves over the first engagement projection 305 onto the free end of the first pushing portion 303 to engage on the first engagement projection 305 and the shutter member 15 is held in the position to cover the head opening 13, as shown in FIG. 38. At this time, the pushing portion 105 is pushed and supported on the first pushing portion 303, and so the shutter member 15 is limited from being further moved. Thus, the shutter member 15 is held in the position to cover the head opening 13.

Figure 39:
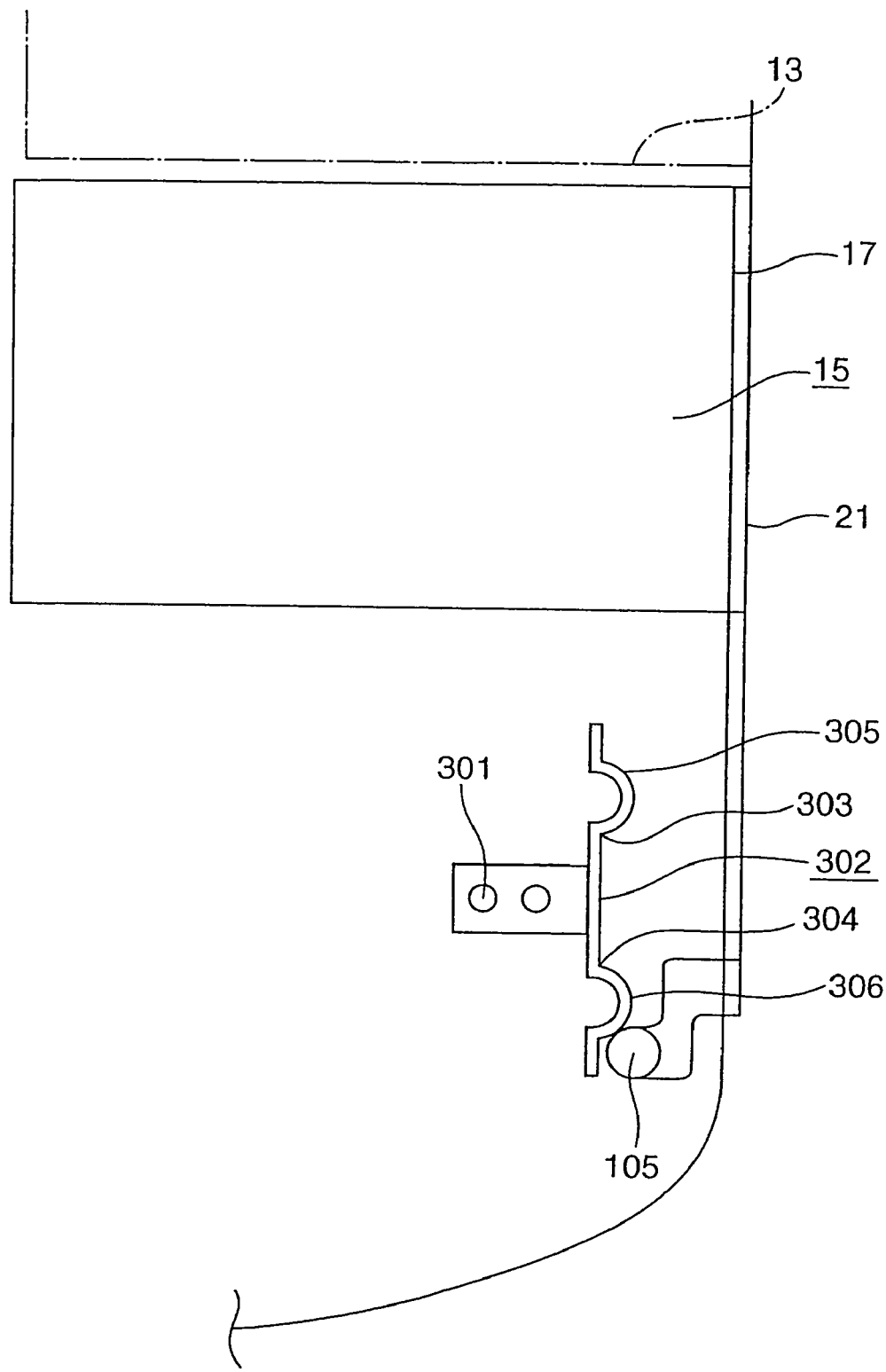
FIG. 39 is also a plan view of the disk cartridge in FIG. 37, showing the shutter member having been moved to a position to uncover the head opening to the full extent.

Also, when the shutter member 15 is moved to the position to uncover the head opening 13, the pushing portion 105 moves over the second engagement projection 306 onto the free end of the second pushing portion 304 to engage on the second engagement projection 306 and shutter member 15 is held in the position to uncover the head opening 13, as shown in FIG. 39. At this time, the pushing portion 105 is pushed and supported on the second pushing portion 304, and so the shutter member 15 is limited from being further moved. Thus, the shutter member 15 is held in the position to uncover the head opening 13.

Also, as the disk cartridge 1 including the two-way forcing mechanism 338 constructed as above is inserted into or ejected out of the disk drive unit 50, the shutter member 15 is moved to uncover or cover the head opening 13 and can be held in each of the positions to uncover and cover the head opening 13. In addition, the disk drive unit 50 compatible with this disk cartridge 1 needs not any mechanism intended to hold the shutter member 15 in the position to uncover the head opening 13.

In the foregoing, there have been illustrated and explained the disk cartridges designed compact with the insertion front end thereof being formed to have a semi-circular shape, by way of example. However, the present invention is not limited to the aforementioned disk cartridges but is applicable directly to a disk cartridge having a rectangular cartridge body or a disk cartridge having a write/read opening (head opening) formed in each of the upper and lower lateral sides of a cartridge body. These disk cartridges are similarly advantageous to the aforementioned ones.

That is, the present invention is widely applicable to disk cartridges each having a shutter member to uncover and cover the write/read opening (head opening) formed in a cartridge body.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A disk cartridge comprising:
    a disk;
    a cartridge body housing the disk to be rotatable and having formed therein a write and/or read opening through which a part of the disk is exposed to outside in a range between the inner and outer radii thereof;
    a shutter member supported movably on the cartridge body to uncover and cover the write and/or read opening; and
    a two-way forcing mechanism to force the shutter member toward any one of a direction to cover the write and/or read opening and a direction to uncover the write and/or read opening.

2. The disk cartridge according to claim 1, wherein the two-way forcing mechanism forces the shutter member in any one of directions to cover and uncover the write and/or read opening correspondingly to a position of the shutter member relative to the write and/or read opening.

3. The disk cartridge according to claim 1, wherein the two-way forcing mechanism is provided upstream of the moving direction of the shutter member to uncover the write and/or read opening.

4. The disk cartridge according to claim 1, wherein the two-way forcing mechanism is formed from a return helical spring connected between the shutter member and cartridge body.

5. The disk cartridge according to claim 4, wherein the return helical spring includes:
    a first coil portion formed at the middle thereof and from which a pair of arm portions extends; and
    a second coil portion provided at the free end of one of the arm portions and wound in a direction opposite to the winding direction of the first coil portion,
    the second coil being supported pivotably at a part of the cartridge body while the second arm portion is supported on the shutter member, thereby forcing the shutter member in either direction to cover or uncover the write and/or read opening.

6. The disk cartridge according to claim 5, wherein the return helical spring includes an engagement portion bent at the free end of the other arm portion to have a generally horseshoe-like shape and whose portion extending from the second arm portion and/or portion bent parallel to the extension portion form a predetermined angle with the extending direction of the other arm portion, and the engagement portion is engaged on the shutter member.

7. The disk cartridge according to claim 1, wherein the two-way forcing mechanism includes:
    a pivoting member supported pivotably on the cartridge body and which is pushed to turn by the pushing portion of the shutter member when the shutter member is moved in a direction to uncover or cover the write and/or read opening; and
    a forcing member to force the pivoting member to turn toward the pushing portion, the pivoting member having:
    a first slope which guides the shutter member in a direction to cover the write and/or read opening; and
    a second slope which guides the shutter member in a direction to uncover the write and/or read opening.

8. The disk cartridge according to claim 7, wherein the pivoting member and forcing member is formed integrally with each other from a leaf spring.

9. The disk cartridge according to claim 1, wherein the two-way forcing mechanism is formed from a leaf spring, the leaf spring including:
    a first engagement projection which is engaged on the pushing portion of the shutter member, when the shutter member is moved to a position to cover the write and/or read opening, to hold the shutter member in the position to cover the write and/or read opening; and
    a second engagement projection which is engaged in the pushing portion of the shutter member, when the shutter member is moved to a position to uncover the write and/or read opening, to hold the shutter member in the position to uncover the write and/or read opening.

10. The disk cartridge according to claim 1, wherein:
    the cartridge body has an insertion front end formed to have a generally semi-circular shape whose center is concentric with that of the disk housed in the cartridge body; and
    the write and/or read opening is formed at a lateral side other than the circular one thereof.

11. The disk cartridge according to claim 1, wherein the lateral side on which the shutter member moves is parallel to the moving direction of the shutter member.

12. A disk cartridge comprising:
a disk;
a cartridge body housing the disk to be rotatable and having formed therein a write and/or read opening through which a part of the disk is exposed to outside in a range between the inner and outer radii thereof;
a shutter member supported movably on the cartridge body, having formed in one moving-directional end portion thereof a partially discontinuous engagement hole and which uncovers and covers the write and/or read opening; and
a return helical spring including a first coil portion formed at the middle thereof and from which a pair of arm portions extends, a second coil portion provided at the free end of one of the arm portions and which is supported pivotably on a part of the cartridge body, and an engagement portion bent at the free end of the other arm portion to have a generally horseshoe-like shape and whose portion extending from the second arm portion and/or portion bent parallel to the extension portion form a predetermined angle with the extending direction of the other arm portion,
the engagement portion being engaged in the engagement hole formed in the shutter member, whereby the shutter member is forced in any one of directions to cover the write and/or read opening and uncover the write and/or opening.

13. The disk cartridge according to claim 12, wherein in the return helical spring, the first and second coil portions are wound a plurality of turns in directions opposite to each other.

14. The disk cartridge according to claim 12, wherein the return helical spring forces the shutter member in any one of directions to cover and uncover the write and/or read opening correspondingly to a position of the shutter member relative to the write and/or read opening.

15. The disk cartridge according to claim 12, wherein the return helical spring is provided upstream of the moving direction of the shutter member to uncover the write and/or read opening.

16. The disk cartridge according to claim 12, wherein:
the cartridge body has an insertion front end formed to have a generally semi-circular shape whose center is concentric with that of the disk housed in the cartridge body; and
the write and/or read opening is formed at a lateral side other than the circular one thereof.

17. The disk cartridge according to claim 16, wherein the lateral side on which the shutter member moves is parallel to the moving direction of the shutter member.

* * * * *